(12) United States Patent
Kiyono

(10) Patent No.: US 7,381,458 B2
(45) Date of Patent: Jun. 3, 2008

(54) RECORDING MEDIUM

(75) Inventor: Kenjirou Kiyono, Minato-ku (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 132 days.

(21) Appl. No.: 11/328,296

(22) Filed: Jan. 10, 2006

(65) Prior Publication Data

US 2006/0120262 A1 Jun. 8, 2006

Related U.S. Application Data

(63) Continuation of application No. PCT/JP2004/012233, filed on Aug. 19, 2004.

(30) Foreign Application Priority Data

| Aug. 21, 2003 | (JP) | ............................ 2003-297711 |
| Oct. 31, 2003 | (JP) | ............................ 2003-371871 |
| May 31, 2004 | (JP) | ............................ 2004-161554 |

(51) Int. Cl.
*B32B 3/02* (2006.01)

(52) U.S. Cl. .................. 428/64.1; 428/64.4; 428/64.5; 430/270.11; 430/270.12

(58) Field of Classification Search ............... 428/64.1, 428/64.4, 64.5; 430/270.11, 270.12, 270.13
See application file for complete search history.

(56) References Cited

U.S. PATENT DOCUMENTS

| 4,839,208 | A | | 6/1989 | Nakagawa et al. |
| 5,034,255 | A | | 7/1991 | Shigematsu et al. |
| 5,252,370 | A | | 10/1993 | Tominaga et al. |
| 5,401,609 | A | | 3/1995 | Haratani et al. |
| 5,889,756 | A | * | 3/1999 | Ichihara et al. .......... 369/275.2 |
| 2005/0233247 | A1 | * | 10/2005 | Hosoda et al. ......... 430/270.12 |

FOREIGN PATENT DOCUMENTS

| CA | 2 459 838 | 1/2004 |
| EP | 0 243 958 A2 | 11/1987 |
| EP | 0 366 455 A2 | 5/1990 |
| EP | 1 609 614 A1 | 12/2005 |
| JP | 61-031288 | 2/1986 |
| JP | 61-34741 | 2/1986 |
| JP | 62-011685 | 1/1987 |
| JP | 62-256691 | 11/1987 |
| JP | 62-278094 | 12/1987 |
| JP | 62-278095 | 12/1987 |
| JP | 63-299984 | 12/1988 |
| JP | 02-147392 | 6/1990 |
| JP | 02-165991 | 6/1990 |
| JP | 02-249687 | 10/1990 |
| JP | 02-277689 | 11/1990 |
| JP | 03-114778 | 5/1991 |
| JP | 03-153389 | 7/1991 |
| JP | 04-121842 | 4/1992 |
| JP | 4-298389 | 10/1992 |
| JP | 5-166225 | 7/1993 |
| JP | 5-212967 | 8/1993 |
| JP | 05-212967 | 8/1993 |
| JP | 6-262854 | 9/1994 |
| JP | 10-222871 | 8/1998 |
| JP | 10-329424 | 12/1998 |
| JP | 2000-076701 | 3/2000 |
| JP | 2002-251780 | 9/2002 |
| JP | 2004-90610 | 3/2004 |
| JP | 2004-276337 | 10/2004 |
| WO | 03/101750 | 12/2003 |

OTHER PUBLICATIONS

Yasuo Hosoda, et al., "BD-type Write-Once Disk with Full-Pollutant-Free Material and Starch Substrate", Technical Digest, International Symposium on Optical Memory 2004, Oct. 11-15,2004, 4 cover pages, pp. 12 and 13.

Yasuo Hosoda, et al., "Eco-friendly recordable disk (Eco-R) for blue", 2002 International Symposium on Optical Memory and Optical Data Storage Topical Meeting, Technical Digest, Jul. 7-11, 2002, 4 pages.

Yasuo Hosoda, et al., "Recording Mechanism of High-Density Write-Once Disks using Inorganic Recording Material", International Symposium on Optical Memory 2003, Technical Digest, Nov. 3-7, 2003, 3 cover pages, pp. 74 and 75.

Yasuo Hosoda, et al., "Recording Mechanism of High-Density Write-Once Disks Using Inorganic Recording Material", Japanese Journal of Applied Physics, part 1, vol. 43, No. 7B, Jul. 2004, 1 cover page and pp. 4997-5000.

Yasuo Hosoda, et al., "Inorganic Recordable Disk with More Eco-Friendly Material for Blue", Japanese Journal of Applied Physics, part 1, vol. 42, No. 2B, Feb. 2003, 1 cover page, pp. 1040 and 1041.

* cited by examiner

*Primary Examiner*—Elizabeth Mulvaney
(74) *Attorney, Agent, or Firm*—Oblon, Spivak, McClelland, Maier & Neustadt, P.C.

(57) ABSTRACT

The main object of the present invention is to provide a recording medium which makes high densification of information possible, particularly a write-once-read-many optical recording medium having good recording signal characteristics to a wide range of recording powers.

The present invention is one to accomplish the above object by providing a recording medium having a recording layer, whereby recording is carried out by heating the recording layer, characterized in that the recording layer contains a substance A which decomposes at a temperature which the recording layer reaches when heated for recording, and a substance B which does not undergo a chemical reaction or phase change at a temperature which the recording layer reaches when heated for recording.

18 Claims, 8 Drawing Sheets

RECORDING MEDIUM

TECHNICAL FIELD

The present invention relates to a recording medium whereby recording is carried out by heating a recording layer. Particularly, such a recording medium is a write-once-read-many optical recording medium whereby recording is carried out by laser irradiation, characterized in that the recording layer contains a substance which decomposes at a temperature which the recording layer reaches when heated by the laser, and a substance which does not undergo a change such as a chemical reaction at such a temperature.

BACKGROUND ART

As recording media for recording information such as writings, sounds or images, recording media have heretofore been known which employ e.g. a phase change material made of a magnetic material, a magnetooptical material, an organic dye material or an inorganic material, for a recording layer.

Such recording media are designed so that a physical parameter of the recording layer, such as the refractive index, electrical resistance, shape, volume or density, is changed by imparting an external factor to the recording layer, such as heating of the recording layer by irradiation with light or conducting an electrical current, or application of a magnetic field to the recording layer. And, such recording media are usually designed to carry out recording or readout of information by utilizing the difference in such a physical parameter value as between before and after imparting the external factor to the recording layer.

An example of such recording media is optical recording media whereby recording is carried out by irradiation of a laser beam. Such optical recording media may further be generally classified into a write-once-read-many optical recording medium which is only once writable and not rewritable, and a rewritable optical recording medium which is repeatedly rewritable. Among such optical recording media, a write-once-read-many optical recording medium has attracted attention in recent years for such a reason that it is suitable for recording e.g. official documents in which no change of information is permitted, it is suitable for high speed recording, or the production cost can be made low.

For the write-once-read-many optical recording medium, various types such as a phase-change type, an alloy type and a perforated type employing inorganic material, or ones employing organic compounds, have been proposed. Among them, a type as disclosed in JP-A-4-298389, wherein an inorganic substance capable of discharging a gas is incorporated in a thin recording layer, and a gas is discharged under heating by laser irradiation so that recording is carried out by a deformation thereby formed, is prospective, since it is possible to take a large signal amplitude, and secure high irreversibility to prevent rewriting.

According to JP-A-4-298389, if an inorganic substance which is decomposed by heating to discharge a gas, such as silver oxide or iron nitride, is used as a recording layer, a gas will be discharged under heating by laser irradiation, and voids will be formed by the discharged gas or recesses will be formed at the interface of the recording layer by the pressure of the discharged gas. And, by the formation of such voids or recesses, the optical constants or optical conditions such as the light path length at the irradiated portion will be changed, and the reflectance will be lowered, whereby a large signal amplitude can be obtained.

DISCLOSURE OF THE INVENTION

With respect to the above-mentioned write-once-read-many optical recording medium, it has been desired in recent years to develop a write-once-read-many optical recording medium which makes high densification of information possible as compared with heretofore in order to carry out recording/readout of a large capacity data such as a long-moving picture.

According to a study made by the present inventors, it was found impossible to obtain an optical recording medium having a practically sufficient performance even if the technique disclosed in the above-mentioned JP-A-4-298389 was employed in order to obtain a write-once-read-many optical recording medium which makes such higher densification possible. Namely, it was impossible to obtain sufficient recording characteristics with an optical recording medium wherein a single substance of an oxide or nitride decomposable under heating by irradiation of a laser beam, was employed for a recording layer. Namely, it was found that although it was possible to take a sufficiently large amplitude of recording signals, the recording power range (the power margin) wherein good recording signal characteristics can be obtained, was very narrow, and with a recording medium utilizing decomposition of the recording layer made of single substance, high densification was difficult.

An object of the present invention is to solve the above problems and to realize a recording medium having a density higher than the conventional recording media. Particularly, it is an object of the present invention to provide a write-once-read-many optical recording medium having good recording signal characteristics to a wide range of recording powers, particularly with respect to a write-once-read-many optical recording medium whereby higher density recording than conventional write-once-read-many optical recording media, is required.

The present inventors have conducted an extensive study under the above circumstances, and as a result have found that by incorporating a substance which decomposes at a temperature which the recording layer reaches when heated for recording and a substance which does not undergo a change such as a chemical change at such a temperature, the range of the recording power wherein good recording signal characteristics can be obtained, will be widened, and high densification of information will be possible. Thus, the present invention has been accomplished.

Namely, the present invention provides a recording medium having a recording layer, whereby recording is carried out by heating the recording layer, characterized in that the recording layer contains a substance A which decomposes at a temperature which the recording layer reaches when heated for recording, and a substance B which does not undergo a chemical reaction or phase change at a temperature which the recording layer reaches when heated for recording.

According to the present invention, in the recording medium whereby recording of information is carried out by heating the recording layer, the substance A which decomposes at the time of heating, is incorporated in the recording layer, and by decomposition of this substance A, a physical parameter value such as the refractive index, the shape or the like of the recording layer, is changed. And, by coexistence in the recording layer of the stable substance B which does not undergo a chemical reaction or phase change by heating at the time of recording, it is possible to control the decomposition ratio to the entire recording layer, thereby to improve the recording density and stability of the recording characteristics.

In the present invention, it is preferred that the above substance B does not undergo a chemical reaction and a phase change at the temperature which the above recording layer reaches. In such a case, it is preferred that the substance B does not decompose or chemically react at the temperature which the recording layer reaches. Further, it is preferred that the substance B does not melt or sublime at the temperature which the recording layer reaches. If one having the above nature is employed as the substance B, it is possible to further increase the stability of the substance B.

Further, in the present invention, it is preferred that the difference between the decomposition temperature of the substance A and the decomposition temperature or the melting point of the substance B is at least 200° C.

If the difference between the decomposition temperature of the substance A and the decompositions temperature or the melting point of the substance B is within the above range, the roles of the substance A and the substance B can be made more distinct.

Further, the recording medium of the present invention is preferably a write-once-read-many optical recording medium having a recording layer on a substrate, whereby recording is carried out by laser irradiation.

Namely, in a case where the recording medium of the present invention is particularly a write-once-read-many optical recording medium, it becomes possible to obtain good recording signal characteristics to a wide range of recording powers, with a high density optical recording medium, by forming a recording layer from a mixture comprising the substance A which decomposes under heating by laser irradiation and the substance B which does not undergo a chemical change or phase change.

Further, in the present invention, it is preferred that the substance A is a substance having a decomposition temperature at at most 1,200° C., and the substance B is a substance having no decomposition temperature or melting point at at most 1,500° C. Namely, for heating of the recording layer by laser irradiation, about 1,200° C. is practically an upper limit. Accordingly, the substance A is preferably such that the decomposition temperature is at most 1,200° C. Further, if a substance having neither decomposition temperature nor melting point at at most 1,500° C., is used as the substance B, there will be no decomposition or other change by heating at the time of recording or by other environmental changes.

Further, in the present invention, each of the substance A and the substance B is preferably a nitride and/or an oxide.

The nitride and the oxide have small particle diameters, whereby noise in the recording signals can be reduced, and substances having proper optical constants can be selected. Further, when the nitride or the oxide is used as the substance A, the volume change by decomposition tends to be large, whereby a larger signal amplitude can be obtained. Further, when the nitride or the oxide is used as the substance B, it can be selected from substances having high melting points and low reactivities, whereby good recording signal characteristics can be obtained.

In the above case, the substance A is preferably a nitride of at least one element selected from the group consisting of Cr, Mo, W, Fe, Ge, Sn and Sb. Further, the above substance B is preferably a nitride of at least one element selected from the group consisting of Ti, Zr, Hf, V, Nb, Ta, Al and Si. Namely, nitrides of these elements are substances having their decomposition temperatures and melting points within the proper ranges as the substance A and the substance B.

Further, in such a case, it is preferred that element α other than nitrogen and oxygen among elements constituting the substance A and element β other than nitrogen and oxygen among elements constituting the substance B satisfy the relation of $0.03 \leq$ (atomicity of $\beta$)/((atomicity of $\alpha$)+(atomicity of $\beta$))$\leq 0.95$.

Particularly preferably, (atomicity of $\beta$)/((atomicity of $\alpha$)+(atomicity of $\beta$))$\leq 0.7$.

Namely, within the above range, the range of the recording power within which good recording signal characteristics can be obtained, can be widened, while sufficiently securing the amplitude of recording signals.

Further, in the present invention, it is preferred that the thickness of the recording layer is from 4 nm to 30 nm. Within this range, absorption of the incident laser beam will be sufficient, whereby the recording sensitivity will be good, and the amplitude of recording signals will be sufficiently large. On the other hand, the reflectance will sufficiently be secured, and the amount of the gas discharged by the decomposition of the substance A will be in a proper range, whereby the effect of making the recording layer to have the above construction, will be remarkable.

Further, in the present invention, it is preferred that a coherent layer is provided in contact with the recording layer. By providing such a coherent layer, it is possible to prevent peeling from the recorded layer a layer in contact with the recording layer when the substance A is decomposed during recording.

In such a case, it is preferred that a protective layer is provided in contact with the coherent layer. Namely, during recording, peeling is likely to take place between the above recording layer and the above protective layer, and by providing the coherent layer between them, it is possible to prevent peeling between them.

Further, it is preferred that the above coherent layer contains a substance having a decomposition temperature higher than the above substance A. Namely, if the above coherent layer contains a substance having a decomposition temperature higher than the above substance A, even if the above substance A decomposes during recording, the material containing in the coherent layer will not decompose, whereby a good recorded state can be obtained.

Further, it is preferred that the above coherent layer contains at least one member selected from the group consisting of GeN, ZrO, ZnO and SiC, as the main component. Namely, even if the above substance A decomposes during recording, the above coherent layer will not decompose since it contains GeN, ZrO, ZnO or SiC as the main component, whereby a good recorded state can be obtained.

Further, in the present invention, it is preferred that the extinction coefficient at the recording laser wavelength of the recording layer is at least 0.2 and at most 1.6. Within this range, absorption of the incident laser beam will be sufficient, whereby the recording sensitivity will be good, and a sufficient reflectance can be obtained.

In the present invention, "a chemical reaction" means a phenomenon such that a substance changes to another substance by itself or an interaction with another substance. Specifically, "the substance B undergoes a chemical reaction" means that the substance B decomposes, or the substance B chemically reacts with another substance. Here, "chemically reacts" means that atoms of at least two elements will bond to each other by a chemical bonding power. Accordingly, "the substance B chemically reacts" means that the substance B bonds to another substance or atom of another element.

On the other hand, "phase" in the phase change means one of solid phase, liquid phase and gas phase. Accordingly, "phase change" means a change from one phase to the other phase, between two phases among solid phase, liquid phase and gas phase.

Further, "substance" means a single element or a compound constituted by a plurality of elements and is one having a substance which will be usually solid at normal temperature (25° C.) under normal humidity (50% RH).

The substance "decomposes" means that "the substance changes to at least two simpler substances" in a case where the substance is a compound constituted by a plurality of elements.

The "decomposition temperature" of the substance means "the temperature at which the substance changes to at least two simpler substances" in a case where the substance is a compound constituted by a plurality of elements. Further, the "melting point" of the substance means "the temperature at which the substance melts".

EFFECTS OF THE INVENTION

According to the present invention, it is possible to obtain a recording medium which can be adapted for high densification of information. Particularly, it is possible to obtain a write-once-read-many optical recording medium having a wide recording power range wherein good recording signal characteristics can be obtained.

DESCRIPTION OF SYMBOLS

Figure 1:
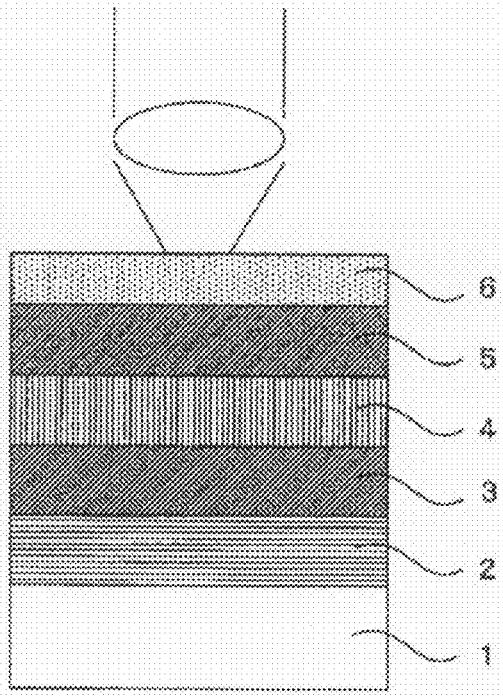
FIG. 1 is a schematic view illustrating a structural example of a write-once-read-many optical recording medium according to the present invention.

1: a substrate
2: a reflective layer
3, 5: protective layers
4: a recording layer
6: a light transmission layer
7: a diffusion preventing layer
8: an underlayer
9: a protective coating layer
10: a coherent layer

BEST MODE FOR CARRYING OUT THE INVENTION

Now, the present invention will be described in detail with reference to practical embodiments, but it should be understood that the present invention is by no means restricted to such embodiments and can be practiced by modifying them variously within its scope.

The recording medium of the present invention is a recording medium having a recording layer, whereby recording is carried out by heating the recording layer, characterized in that the recording layer contains a substance A which decomposes at a temperature which the recording layer reaches when heated for recording, and a substance B which does not undergo a chemical reaction or phase change at a temperature which the recording layer reaches when heated for recording.

Such a recording medium is designed so that a physical parameter of the recording layer such as the refractive index or the shape, is changed by heating the recording layer, and the difference in such a physical parameter as between before and after the change is utilized to carry out recording or readout of information.

Heating of the recording layer may be carried out, for example, by a method wherein the recording medium is locally irradiated with light, and the recording layer is heated by heat generated by the light irradiation (for example, a method of carrying out heating of the recording layer of a recording medium by irradiation with a laser beam). Further, heating of the recording layer may, for example, be carried out by a method wherein a voltage is applied locally to the recording medium, and the recording layer is heated by the Joule heat. The method for heating the recording layer is not particularly limited. And, the substance A is decomposed at the temperature reached by the heating of the recording layer, thereby to change the value of a physical parameter of the recording layer such as the refractive index, electrical resistance, shape or density. In such a case, if only the substance A is incorporated in the recording layer, control of the decomposition amount of the recording layer tends to be difficult.

In the present invention, together with the substance A, the substance B stable at the temperature reached by the heating of the recording layer is contained in the recording layer. By the presence of the substance B, it will be possible to control the decomposition amount of the substance A, to control the shape (size) of the information recorded portion and to control the recording position of information, satisfactorily. For example, by adjusting the contents of the substance A and the substance B, it becomes possible to facilitate control of the size of the record is marks or the position for forming record marks.

Specifically, adjustment is made so that the substance B will not undergo a chemical change or phase change at the temperature which the recording layer reaches by the heating. By adjusting the nature of the substance B as described above, constant recording can be carried out.

In order to obtain a more stable substance B, the substance B preferably does not undergo a chemical reaction and a phase change at the temperature which the recording layer reaches by the heating. Here, "the chemical reaction of the substance B" may, for example, be a case where the substance B will decompose, or a case where the substance B will chemically react with another substance. Further, "the phase change of the substance B" may, for example, be a case where the substance B will melt, or a case where the substance B will sublime.

Accordingly, it is preferred that the substance B does not decompose or chemically react at the temperature which the recording layer reaches. Likewise, it is preferred that the substance B does not melt or sublime at the temperature which the recording layer reaches. Namely, by using one having the above nature as the substance B, it becomes possible to control the size of record marks or the position of the record marks more satisfactorily.

In order to maintain the relation between the substance A and the substance B, the difference between the decomposition temperature of the substance A and the decomposition temperature or the melting point of the substance B is preferably at least 200° C., more preferably at least 300° C., further preferably at least 500° C., particularly preferably at least 1,000° C. Within such a range, the effects of the present invention will be distinct.

The larger the difference between the decomposition temperature of the substance A and the decomposition temperature or the melting point of the substance B, the better. However, practically, such a difference is at most 3,000° C.

The substance A and the substance B to be used in the present invention are not particularly limited so long as they are substances having the above-described characteristics at the temperature which the recording layer reaches by the heating at the time of recording. Accordingly, the substance A and the substance B can be variously selected depending upon the temperature which the recording layer reaches during recording by the method of heating the recording layer as described above. Preferred types of the substance A and the substance B, ratio of the substance A to the substance B, proportions of the substances A and B in the entire recording layer, etc., will be described in further detail with reference to the recording layer of the after-mentioned write-once-read-many optical recording medium as an example.

Here, a write-once-read-many optical recording medium is a preferred example of the recording medium to be used in the present invention. Accordingly, the description relating to the substances A and B in the following is not limited to the application to a write-once-read-many optical recording medium. Namely, the description relating to the substances A and B in the following is, needless to say, applicable to recording media other than the write-once-read-many optical recording medium.

The layer structure of the recording medium of the present invention is not particularly limited so long as it has at least a recording layer, and may be suitably selected depending upon the recording method.

In the present invention, it is particularly preferred that the above recording medium is a write-once-read-many optical recording medium having a recording layer on a substrate, whereby recording is carried out by laser irradiation. The write-once-read-many optical recording medium is widely useful, and the demand for high densification thereof is high. Therefore, when the recording medium of the present invention is made to be a write-once-read-many optical recording medium, the effects of the present invention will be distinctly obtained.

Now, the present invention will be described in further detail with reference to such a particularly preferred embodiment. As a matter of course, the recording medium to be used in the present invention is by no means restricted to the mode of the following write-once-read-many optical recording medium.

[1] Write-once-read-many Optical Recording Medium

The write-once-read-many optical recording medium as a particularly preferred embodiment in the present invention is one having a recording layer on a substrate, whereby usually, recording is carried out by irradiating the recording layer with a laser. Now, the recording layer and the substrate constituting the write-once-read-many optical recording medium will be described in detail.

(1) Recording Layer

The recording layer to be used in the present invention is one which contains a substance A which decomposes at a temperature which the recording layer reaches when heated for recording, and a substance B which does not undergo a chemical reaction or phase change at a temperature which the recording layer reaches when heated for recording.

In the present invention, the relation between the substance A and the substance B contained in the recording layer is preferably as follows.

Namely, it is preferred that the substance A is a substance having a decomposition temperature of at most 1,200° C., and the substance B is a substance which does not have a decomposition temperature and a melting point at at most 1,500° C. Now, the reason for using the substance A and the substance B in combination and the reason for adjusting the decomposition temperatures, etc. within the above-mentioned ranges, will be described.

The substance A will decompose by the temperature rise of the recording layer by laser irradiation (usually the temperature rise to about 1,200° C. is the limit).

If a substance which discharges a gas upon decomposition, such as a nitride or oxide having a low decomposition temperature, is used as the substance A, and high density recording is attempted by using only this substance A for the recording layer, the signal amplitude can be sufficiently taken. However, a write-once-read-many optical recording medium employing such a recording layer has a problem such that the recording signal characteristics such as the jitter value, tend to be inadequate, and the recording power range to present proper recording signal characteristics, is rather narrow. This is considered to be such that if only the substance A is used for the recording layer, the size of record marks can not satisfactorily be controlled. Namely, if only the substance A is employed for the recording layer, the amount of the gas discharged by laser irradiation will increase, and the deformation amount of the recording layer tends to be excessive. Therefore, it is considered to be difficult to control the size of small record marks required for high density recording with good precision.

In the present invention, as the substance A which decomposes by laser irradiation, a substance which discharges a gas upon decomposition by laser irradiation may, for example, be used. And, in the present invention, by using the substance B which does not undergo a chemical reaction or phase change or other changes by laser irradiation (will be present stably in the recording layer), in combination with such substance A, it becomes possible to obtain a wide power margin even when applied to high density recording.

Namely, as compared with a recording layer comprising a single substance of the substance A, in the recording layer employing the substance A and the substance B in combination, the amount of the gas discharged from a unit area by laser irradiation can be reduced if the thickness of the recording layer is the same. Accordingly, the deformation amount at the time of recording can also be reduced, and it becomes possible to control the size of record marks with good precision.

As mentioned above, for heating of the recording layer by laser irradiation, about 1,200° C. is the practical upper limit. Accordingly, the substance A is required to decompose at the temperature which the recording layer reaches by the heating of the recording layer, and the decomposition temperature is preferably at most 1,200° C. However, if the decomposition temperature of the substance A is extremely low, the stability with time of the recording medium may sometimes be impaired. Therefore, the lower limit of the decomposition temperature of the substance A is usually at least 100° C., preferably at least 150° C., more preferably at least 200° C. The lower limit of the decomposition temperature of the substance A may be set so that an adequate margin can be obtained depending upon the particular application of the recording medium.

On the other hand, as the substance B, it is preferred to employ a substance which does not have a decomposition temperature and a melting point at at most 1,500° C. If such a substance is employed as the substance B, it does not undergo decomposition and other changes by the heating at the time of recording or by other environmental changes, such being desirable. The upper limits of the decomposition temperature and the melting point of the substance B are not particularly limited, but usually, it has a decomposition temperature or a melting point at at most 3,500° C.

Types of Substance A and Substance B

Materials to be used as the substance A and the substance B are not particularly limited so long as they satisfy the prescribed nature in the present invention. For the reason that such a nature can easily be satisfied, it is preferred to employ inorganic substances for both substances A and B. Inorganic substances have a merit such that a substance which decomposes by the temperature rise of the recording layer and a substance which is stably present without decomposition by the temperature rise of the recording layer can, respectively, easily be obtained.

More specifically, each of the substance A and the substance B is preferably a nitride and/or an oxide. Namely, the nitride and the oxide have small particle sizes and are excellent in that noise of recording signals can be reduced, and one having proper optical constants (refractive index and extinction coefficient) can be selected.

Further, if a nitride and/or an oxide which discharges gaseous nitrogen or gaseous oxygen when it reaches the decomposition temperature, is employed as the substance A, a large deformation can be formed in the recording layer by the volume change at that time, and at the same time, a large optical change can be formed, whereby a large signal amplitude will be obtained.

Further, if an oxide and/or nitride (preferably having a decomposition temperature and a melting point of at least 1,500° C.) which does not undergo a chemical reaction or phase change at the temperature which the recording layer reaches by the heating at the time of recording, is employed as the substance B, it becomes possible to select an extremely stable substance. Further, such a substance has a low reactivity with other substances, whereby it becomes possible to prepare an extremely stable recording medium.

As mentioned above, as the substance A and the substance B, it is preferred to employ a nitride and/or an oxide. As the substance A, it is possible to select any one of a nitride only, an oxide only and a mixture of a nitride and an oxide. Likewise, as the substance B, it is possible to select any one of a nitride only, an oxide only and a mixture of a nitride and an oxide.

Among them, as the substance A, it is preferred to employ a nitride only or an oxide only. Namely, if a mixture of a nitride and an oxide is used as the substance A, the decomposition reactions will be multi stages when the recording layer is heated, whereby control of the mark shapes may sometimes become difficult.

On the other hand, the substance B may simply be present stably in a state where the recording layer is heated, and it may be any one of a nitride only, an oxide only and a mixture of a nitride and an oxide. By properly selecting the type of the substance B, it becomes possible to control the optical characteristics, etc. of the recording layer satisfactorily.

When a nitride or an oxide is used as the substance A, the nitride or oxide to be used may be of one type or a plurality of types. However, the substance A (for example, a substance having a decomposition temperature at at most 1,200° C.) is preferably of one type. Namely, if the substance which decomposes by the temperature rise by laser irradiation, is of plural types, the reaction at the time of recording will be multi stage reactions, whereby there may be a case where control of the mark shapes becomes difficult.

On the other hand, as mentioned above, the substance (which preferably does not have a decomposition temperature and a melting point at at most 1,500° C.) which does not undergo a chemical reaction or phase change at the temperature which the recording layer reaches by the heating at the time of recording, to be used as the substance B, may be such that the nitride or oxide to be used may be of one type or a plurality of types. The type of the nitride or oxide to be used for the substance B may suitably be selected depending upon the characteristics desired for the recording layer.

As the combination of the substance A and the substance B, a combination of nitrides, a combination of oxides, or a combination of a nitride and an oxide, may be employed. However, a combination of a nitride and a nitride, or a combination of an oxide and an oxide, is preferred. Namely, a combination of a nitride having a decomposition temperature at at most the temperature (e.g. 1,200° C.) which the recording layer reaches by the heating at the time of recording, and a nitride (which preferably does not have a decomposition temperature and a melting point at at most 1,500° C.) which does not undergo a chemical reaction or phase change at the temperature which the recording layer reaches by the heating at the time of recording, is preferred. Further, a combination of an oxide having a decomposition temperature at at most the temperature (e.g. 1,200° C.) which the recording layer reaches by the heating at the time of recording, and an oxide (which preferably does not have a decomposition temperature and a melting point at at most 1,500° C.) which does not undergo a chemical reaction or a phase change at the temperature which the recording layer reaches by the heating at the time of recording, is preferred. Namely, a reactive sputtering method is used in many cases for the preparation of such a recording layer, a combination of nitrides, or a combination of oxides, makes the preparation easy.

Further, as a preferred combination of the substance A and the substance B, a combination of the same metal or semiconductor oxide and nitride, may be mentioned. Namely, a combination of a metal or semiconductor nitride having a decomposition temperature at at most the temperature (e.g. 1,200° C.) which the recording layer reaches by the heating at the time of recording, and a metal or semiconductor oxide (which preferably does not have a decomposition temperature and a melting point at at most 1,500° C.) which does not undergo a chemical reaction or phase change at the temperature which the recording layer reaches by the heating at the time of recording, is preferred. Further, a combination of a metal or semiconductor oxide having a decomposition temperature at at most the temperature (e.g. 1,200° C.) which the recording layer reaches by the heating at the time of recording, and a metal or semiconductor nitride (which preferably does not have a decomposition temperature and a melting point at at most 1,500° C.) which does not undergo a chemical reaction or phase change at the temperature which the recording layer reaches by the heating at the time of recording, is preferred. Namely, a reactive sputtering method is used in many cases for the preparation of such a recording layer, and the preparation will be easy by utilizing a mixed gas containing oxygen and nitrogen as the reactive gas.

As the substance A, it is preferred to employ a metal nitride or a semiconductor nitride having a decomposition temperature at at most the temperature (e.g. 1,200° C.) which the recording layer reaches by the heating at the time of recording. As such a nitride, a nitride of one element selected from the group consisting of Cr, Mo, W, Fe, Ge, Sn and Sb may be mentioned. Among them, a nitride of Mo, Ge, Sn or Sb is preferred, and a nitride of Sn or Sb is particularly preferred, from the viewpoint of the stability and low noise after the recording.

Further, as the substance A, a metal oxide or a semiconductor oxide having a decomposition temperature at at most the temperature (e.g. 1,200° C.) which the recording layer reaches by the heating at the time of recording, may also be mentioned. As such an oxide, it is preferred to employ an oxide of one element selected from the group consisting of Ir, Au, Ag and Pt. Among them, an oxide of Au, Ag or Pt is particularly preferred from the viewpoint of the stability and low noise after the recording.

Such a metal nitride, a semiconductor nitride, a metal oxide or a semiconductor oxide will discharge nitrogen or oxygen and will decompose to a metal or semiconductor single substance, at the temperature which the recording layer reaches at the time of recording.

With respect to some of metal nitrides, semiconductor nitrides, metal oxides and semiconductor oxides exemplified above as the substance A, the decomposition temperatures will be shown in Table 1.

TABLE 1

| Examples of substance A | Decomposition temp. (° C.) | *1 |
|---|---|---|
| Cr nitride | 1,080 | Reference 1 |
| Mo nitride | 200 | Experiment |
| W nitride | 300 | Experiment |
| Fe nitride | 200 to 440 | Reference 2 |
| Ge nitride | 700 | Experiment |
| Sn nitride | 340 | Experiment |
| Sb nitride | 280 | Experiment |
| Ir oxide | 400 | Reference 2 |
| Au oxide | 205 | Reference 2 |
| Ag oxide | 300 | Reference 2 |
| Pt oxide | 500 to 560 | Reference 2 |

*1 Reference 1: Encyclopedia of Chemical Technology, published on Sep. 20, 1988 by Maruzen Co., Ltd. Reference 2: Handbook of Chemistry, Basic, 2nd Edition published on Jun. 20, 1975 by Maruzen Co., Ltd. Experiment: TG-MS (ThermoGravimetry-MassSpectrometry) method:In a process of heating a thin film formed in a thickness of about 2,500 Å on a silicon wafer by a sputtering method, at a rate of 10° C./min in a helium atmosphere by means of an apparatus 5773N, Seiko Tg/DTA6300, manufactured by Agilent, the mass change and (nitrogen) gas discharge of the thin film were detected.

The decomposition temperature was taken as the temperature at which discharge of nitrogen gas, which could be detected with higher precision, started.

Thus, as the substance A, a substance having such a nature that it decomposes at the temperature which the recording layer reaches by the heating at the time of recording, is employed. Of course, it is not necessary that all of the substance A present in the heated portion (the portion of the recording layer which reaches the prescribed temperature) of the recording layer at the time of recording will decompose. Namely, in the present invention, it will suffice that a physical value in the region (the region which reaches the prescribed temperature at the time of recording) subjected to recording in the recording layer undergoes a desired change. The decomposition amount of the substance A present in the region subjected to such recording is sufficient if it is such an amount that induces such a desired change of the physical value. The amount of the substance A which decomposes by recording is usually at least 50%, preferably at least 60%, more preferably at least 70%, of the entire substance A present in the region subjected to recording. On the other hand, the larger the amount of the substance A which decomposes, the better. However, it is usually at most 99.9%.

On the other hand, as the substance B, it is preferred to employ a metal nitride or a semiconductor nitride (which preferably does not have a decomposition temperature and a melting point at at most 1,500° C.) which does not undergo a chemical reaction or phase change at the temperature which the recording layer reaches by the heating at the time of recording. As such a nitride, a nitride of at least one element selected from the group consisting of Ti, Zr, Hf, V, Nb, Ta, Al and Si may be mentioned. Among them, a nitride of Ti, V, Nb, Ta, Al or Si is preferred, and a nitride of Ti, V, Nb, Ta or Si is particularly preferred, from the viewpoint of the stability or low price. Most preferred is a nitride of V or Nb.

Further, as the substance B, a metal oxide or semiconductor oxide (which preferably does not have a decomposition temperature and a melting point at at most 1,500° C.) which does not undergo a chemical reaction or phase change at the temperature which the recording layer reaches by the heating at the time of recording, may be mentioned. As such an oxide, it is preferred to employ an oxide of at least one element selected from the group consisting of Zn, Al, Y, Zr, Ti, Nb, Ni, Mg and Si. Among them, an oxide of Zn, Al, Y, Zr, Nb or Si is particularly preferred from the viewpoint of the stability and low noise after the recording.

With respect to some of metal nitrides, semiconductor nitrides, metal oxides and semiconductor oxides illustrated above as the substance B, the decomposition temperatures or melting points are shown in Table 2.

TABLE 2

| Examples of substance B | Decomposition temp. or melting point (° C.) | *2 |
|---|---|---|
| Ti nitride | m.p. 2,950 | Reference 1 |
| Zr nitride | m.p. 2,980 | Reference 1 |
| Hf nitride | m.p. 3,300 | Reference 1 |
| V nitride | m.p. 2,350 | Reference 1 |
| Nb nitride | Decomposition 2,630 | Reference 1 |
| Ta nitride | Decomposition 2,950 | Reference 1 |
| Al nitride | Stable until 2,200 | Reference 1 |
| Si nitride | Stable until 1,900 | Reference 1 |
| Zn oxide | m.p. 2,000 | Reference 2 |
| Al oxide | m.p. 2,015 | Reference 2 |
| Y oxide | m.p. 2,410 | Reference 2 |
| Zr oxide | m.p. 2,700 to 2,715 | Reference 2 |
| Ti oxide | m.p. 1,640 | Reference 2 |
| Nb oxide | m.p. 1,540 | Reference 2 |
| Ni oxide | m.p. 1,980 | Reference 2 |
| Mg oxide | m.p. 2,800 | Reference 2 |
| Si oxide | m.p. 1,610 to 1,703 | Reference 2 |

*2 Reference 1: Encyclopedia of Chemical Technology, published on Sep. 20, 1988 by Maruzen Co., Ltd. Reference 2: Handbook of Chemistry, Basic, 2nd Edition published on Jun. 20, 1975 by Maruzen Co., Ltd.

Thus, as the substance B, a substance is employed which does not undergo a chemical reaction (as the chemical reaction, "decomposition" or "chemical bonding" may, for example, be mentioned) or phase change (as the phase change, "melt" or "sublimation" may, for example, be mentioned) at the temperature which the recording layer reaches by the heating at the time of recording. Namely, ideally, the substance B preferably undergoes no chemical reaction or phase change by the heating at the time of recording. However, in reality, the substance B present in the heated portion (the region of the recording layer reaching to the prescribed temperature) of the recording layer at the time of recording may undergo a chemical reaction or phase change if in a very small amount. Namely, so long as the record quality (such as the shape and position of record marks) can be maintained satisfactorily, the substance B present in the heated portion (the region of the recording layer reaching to the prescribed temperature) of the recording layer at the time of recording is not required to be stable in its entire amount. The amount of the substance B which may undergo a chemical reaction or phase change by recording is usually at most 10%, preferably at most 5%, more preferably at most 1%, of the entire substance B present in the region subjected to recording. On the other hand, the smaller the amount of the substance B which decomposes, the better. However, in reality, decomposition at a level of 0.01% is assumed to take place.

Proportions of Substance A and Substance B

When each of the substance A and the substance B is constituted by a nitride and/or oxide, it is preferred that element α other than nitrogen and oxygen among elements constituting the substance A and element β other than nitrogen and oxygen among elements constituting the substance B satisfy the relation of 0.03≦(atomicity of β)/((atomicity of α)+(atomicity of β))≦0.95. Namely, it is preferred that the atomicity of element β present in the recording layer becomes at least 0.03 and at most 0.95, to the total of the atomicity of element α and the atomicity of element β. (atomicity of β)/((atomicity of α)+(atomicity of β)) is preferably at least 0.03, more preferably at least 0.05. Within such a range, the effect of adding the substance B becomes sufficiently distinct. On the other hand, (atomicity of β)/((atomicity of α)+(atomicity of β)) is preferably at most 0.95, more preferably at most 0.9, still more preferably at most 0.8, particularly preferably at most 0.7. Within this range, it becomes possible to sufficiently take the amplitude of recording signals.

In a case where as the substance A or the substance B, at least two types of nitrides and/or oxides are used in combination, the following will apply. Namely, (atomicity of α) is the total of atomicities of elements other than nitrogen and oxygen among elements constituting the substance A. Further, (atomicity of β) is the total of atomicities of elements other than nitrogen and oxygen among elements constituting the substance B. And it is preferred that (atomicity of α) and (atomicity of β) satisfy the above relation.

For example, in a case where as the substance A, only one type of a nitride or an oxide having a decomposition temperature at at most 1,200° C., is used, and as the substance B, at least two types of nitrides or oxides which do not have decomposition temperatures and melting points at at most 1,500° C., are used in combination, the proportions of the substance A and the substance B are preferably made to be as follows.

Namely, when a nitride or oxide having a decomposition temperature at at most 1,200° C. is represented by $AN_x$ or $AO_x$ (e.g. A is a metal or semiconductor), and n types of nitrides or oxides which do not have decomposition temperatures and melting points at at most 1,500° C. are represented by $B1N_{y1}$ . . . $BnN_{yn}$, or $B1O_{y1}$ . . . . $BnO_{yn}$ (B1 . . . Bn are metal elements or semiconductors), the atomicity ratio represented by the following formula (1) is made preferably at least 0.03, more preferably at least 0.05 and on the other hand, preferably at most 0.95, more preferably at most 0.9, further preferably at most 0.8, particularly preferably at most 0.7:

(atomicity of $B1$+ . . . +atomicity of $Bn$)/(atomicity of $A$+atomicity of $B1$+ . . . +atomicity of $Bn$)　　(1)

Within the above range, it becomes possible to sufficiently take the amplitude of recording signals, while the effects of adding nitrides or oxides which do not have decomposition temperatures and melting points at at most 1,500° C., can be sufficiently obtained.

The analysis of the composition of such a recording layer can be carried out by electron probe microanalysis (EPMA), X-ray photoelectron spectroscopy (XPS), Auger Electron Spectroscopy (AES), Rutherford Backscattering (RBS), Inductively Coupled Plasma Spectroscopy (ICP) or the like, or a combination thereof.

Proportion of Substances A and B in the Entire Recording Layer

In the present invention, the recording layer preferably contains the substance A and the substance B as the main component.

Here, in the present invention, "contains a prescribed material (the prescribed material may be paraphrased as "a prescribed substance" or "a prescribed composition") as the main component" means that the content of such a prescribed material is at least 50 wt % in the entire material or in the entire layer.

In order to obtain the effects of the present invention sufficiently, the total amount of the substance A and the substance B is usually at least 50 wt %, preferably at least 60 wt %, more preferably at least 70 wt %, in the entire recording layer.

Further, as the recording layer, in addition to the substance A and the substance B, a single substance or semi-oxide of a metal and semiconductor, such as Ti, Zr, Hf, V, Nb, Ta, Cr, Mo, W, Mn, Co, Ni, Pd, Pt, Cu, Ag, Au, Zn, Al, Si, Ge, Sn, Sb, Bi or a lanthanoid metal, may be contained in an amount of at most 30 wt %, preferably at most 20 wt %, more preferably at most 10 wt %, in the entire recording layer, for the purpose of adjusting the optical constants and the thermal conductivity of the recording layer. On the other hand, in a case where the above single substance or semi-oxide of a metal and semiconductor, is incorporated, it is contained usually in an amount of at least 0.001 wt %. Within the above range, the effects of incorporating the single substance or semi-oxide of a metal and semiconductor may be obtained satisfactorily.

Here, "semi-oxide" means a state where oxygen is deficient from a stoichiometrical composition of an oxide.

Such a single substance or semi-oxide of a metal and semiconductor may undergo melting or a change in the oxidized state by the temperature rise by laser irradiation. However, such a change is usually small as compared with the decomposition of the substance A. Therefore, if the proportion occupying in the entire recording layer is within the above range, such a change will not give a serious influence over the recording characteristics. And, the above-mentioned single substance or semi-oxide of a metal and semiconductor may be used for the purpose of e.g. adjusting the optical constants or the thermal conductivity.

Other Properties of the Recording Layer

In the present invention, the extinction coefficient of the recording layer is suitably determined depending upon the particular application. However, the lower limit of the extinction coefficient of the recording layer is preferably at least 0.2, more preferably at least 0.3 at the wavelength of laser to be used for recording/readout. Within this range, absorption of an incident laser beam at the recording layer will be sufficient, and the recording sensitivity will be good. On the other hand, the upper limit of the extinction coefficient is preferably at most 1.6, more preferably at most 1.4, particularly preferably at most 1.2. Within this range, there will be no such a problem that the light absorption at the recording layer is so much that no adequate reflectance can be obtained.

In the present invention, the extinction coefficient may be measured together with the refractive index by ellipsometry.

Further, the thickness of the recording layer may suitably be determined depending upon the particular application. The lower limit of the thickness of the recording layer is usually at least 4 nm, preferably at least 6 nm. Within this range, absorption of an incident laser beam becomes large, whereby the sensitivity will be good, and further, the amplitude of recording signals can be taken sufficiently. On the other hand, the upper limit of the thickness of the recording layer is usually at most 30 nm, preferably at most 25 nm, more preferably at most 20 nm. Within this range, there will be no such a problem that absorption at the recording layer is so much that the reflectance will decrease, or the amount of gas discharged becomes so large that the effects of adding the substance B (preferably a nitride or oxide which does not have a decomposition temperature and a melting point at at most 1,500° C.) will be small.

Method for Producing the Recording Layer

In the present invention, the recording layer is usually produced by a sputtering method. For example, it can be produced by a sputtering method wherein a very small amount of Ar gas is circulated in a vacuum chamber to a prescribed vacuum degree, and a voltage is applied to a target made of the substance A and to a target made of the substance B to permit electric discharge to form a film. Further, for example, it can be produced by a sputtering method wherein a very small amount of Ar gas is circulated in a vacuum chamber to a prescribed vacuum degree, and a voltage is applied to a target made of a mixture of the substance A and the substance B to permit electric discharge to form a film.

In a case where metal nitrides or oxides, or semiconductor nitrides or oxides are employed as the substance A and the substance B, it is also possible to employ a production method by the following reactive sputtering method.

Namely, reactive sputtering is carried out by circulating a very small amount of a mixed gas of Ar, $N_2$ or $O_2$ in a vacuum chamber to a prescribed vacuum degree. And, a voltage is applied to a target made of a mixture comprising a metal or a semiconductor such that its nitride or oxide becomes the substance A, and a metal or semiconductor such that its nitride or oxide becomes the substance B, to permit electric discharge. And, the sputtered composite of metals or semiconductors is reacted with $N_2$ or $O_2$ to form nitrides or oxides in the form of a film, to carry out the reactive sputtering.

Further, instead of using a target of the mixture, the recording layer may be formed by a co-sputtering method wherein electric discharge is simultaneously carried out from a plurality of single substance targets.

(2) Substrate

Particularly in a case where the recording medium of the present invention is a write-once-read-many optical recording medium, the above recording layer is formed on a substrate.

As the substrate to be used for the write-once-read-many optical recording medium of the present invention, it is possible to employ a resin such as a polycarbonate, an acrylic resin or a polyolefin; glass; or a metal such as aluminum. Usually, a guide groove having a depth of about 15 to 250 nm is formed on the substrate, and a substrate made of a resin is preferred whereby such a guide groove can be formed by molding. Further, in the case of a so-called a substrate side incidence (FIGS. 5 and 6) where a focused laser beam for recording/readout is permitted to enter from the substrate side, the substrate is preferably transparent.

The thickness of such a substrate is suitably determined depending upon the particular application. However, the lower limit is usually at least 0.3 mm, preferably at least 0.5 mm and the upper limit is usually at most 3 mm, preferably at most 2 mm.

(3) Other Layers

The write-once-read-many optical recording medium of the present invention may be one having at least the substrate and the recording layer. Therefore, the layer structure is not particularly limited. For example, the write-once-read-many optical recording medium of the present invention may have a heat resistant protective layer formed on at least one side of the recording layer. Further, for example, the write-once-read-many optical recording medium of the present invention may have a reflective layer on the side of the recording layer opposite to the side irradiated with laser. Thus, the write-once-read-many optical recording medium of the present invention may have an optional multilayer structure having a layer having a specific function laminated.

Further, each of such layers may be formed of two or more layers, and an interlayer may be provided between them. For example, a translucent extremely thin metal, semiconductor or absorptive dielectric layer may, for example, be provided between the substrate and the protective layer in the case where the focused laser beam is permitted to enter from the substrate side, or on the protective layer in the case where the focused laser beam is permitted to enter from the side opposite to the substrate. By such a dielectric layer, it becomes possible, for example, to control the amount of the laser energy entering into the recording layer. Now, the layer structure of the write-once-read-many optical recording medium of the present invention will be described in detail with reference to specific examples, but it should be understood that the present invention is by no means restricted to the following specific examples.

[2] One Embodiment of the Write-once-read-many Optical Recording Medium

FIG. 1 is an enlarged cross-sectional view illustrating an embodiment of the write-once-read-many optical recording medium which can be used for the present invention. As shown in FIG. 1, this write-once-read-many optical recording medium is constituted by sequentially laminating on a substrate 1, a reflective layer 2, a protective layer 3 on the reflective layer side, a recording layer 4, a protective layer 5 on the laser beam incident side and a light transmission layer 6 in this order, and is designed to carry out recording and readout by permitting a laser beam to enter from the light transmission layer 6 side.

Figure 2:
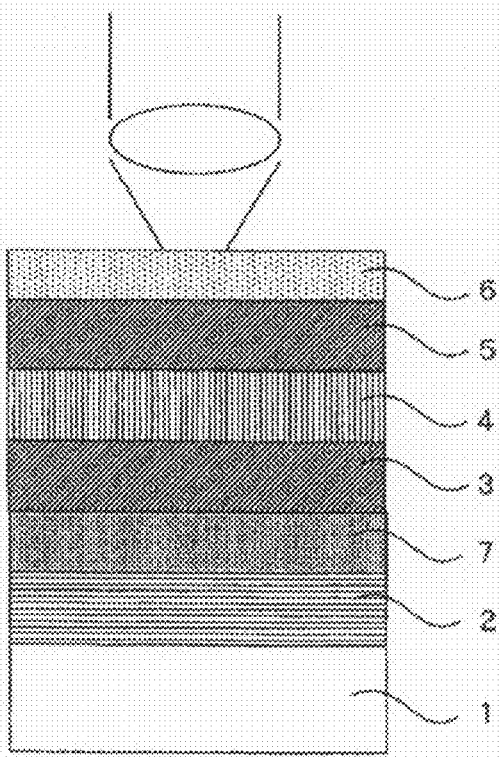
FIG. 2 is a schematic view illustrating a structural example of a write-once-read-many optical recording medium according to the present invention.
Figure 3:
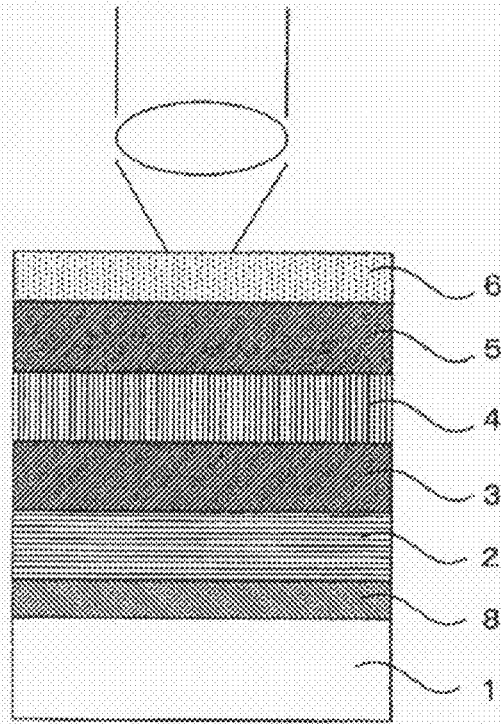
FIG. 3 is a schematic view illustrating a structural example of a write-once-read-many optical recording medium according to the present invention.
Figure 4:
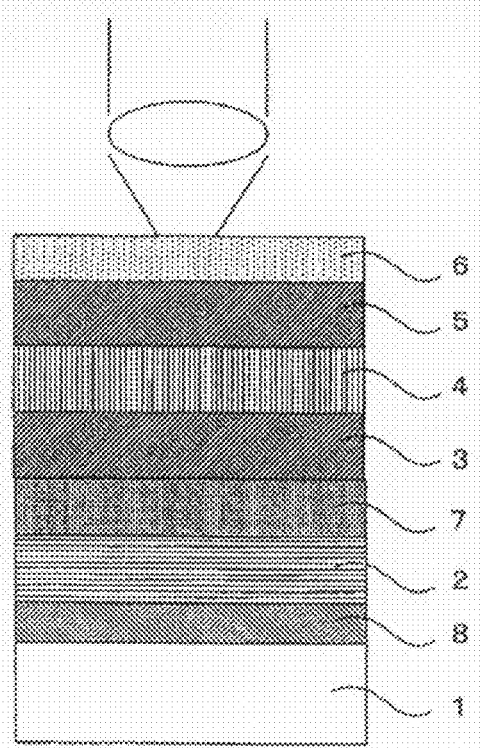
FIG. 4 is a schematic view illustrating a structural example of a write-once-read-many optical recording medium according to the present invention.
Figure 10:
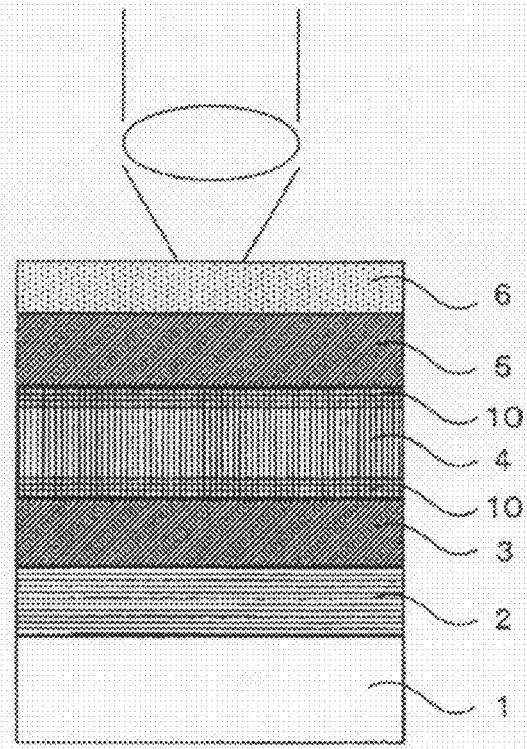
FIG. 10 is a schematic view illustrating a structural example of a write-once-read-many optical recording medium according to the present invention.
Figure 11:
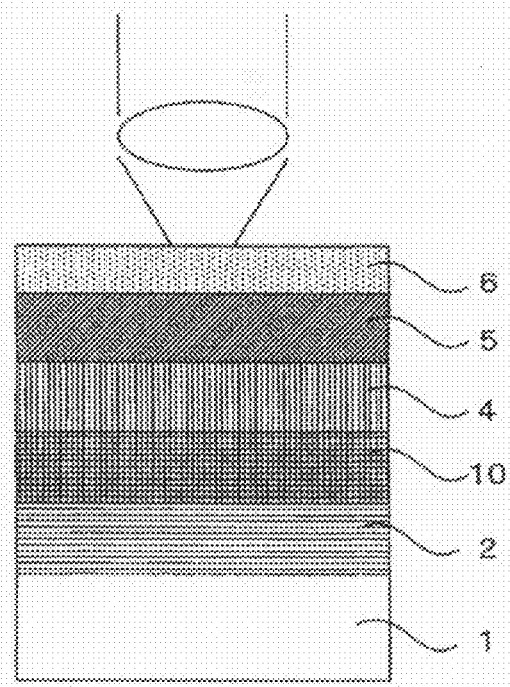
FIG. 11 is a schematic view illustrating a structural example of a write-once-read-many optical recording medium according to the present invention.

The layer structure is not required to be limited to the structure of FIG. 1. For example, as shown in FIG. 2, it is also possible to adopt a layer structure in which a diffusion preventing layer 7 is provided between the reflective layer 2 and the protective layer 3 based on the structure of FIG. 1. Otherwise, as shown in FIGS. 3 and 4, it is possible to adopt layer structures wherein an underlayer 8 is provided between the substrate 1 and the reflective layer 2, based on the structures shown in FIGS. 1 and 2. Otherwise, as shown in FIG. 10, it is possible to adopt a layer structure wherein a coherent layer 10 is provided between the recording layer 4 and the protective layer 3 and between the recording layer 4 and the protective layer 5 (of course, the coherent layer 10 may be provided either between the recording layer 4 and the protective layer 3, or between the recording layer 4 and the protective layer 5). Further, as shown in FIG. 11, it is possible to adopt a layer structure wherein the protective layer 3 is replaced by a coherent layer 10 (of course, the protective layer 5 may be replaced by a coherent layer 10). Here, it is of course possible to suitably combine the above-mentioned layer structures depending upon the desired performance.

Figure 5:
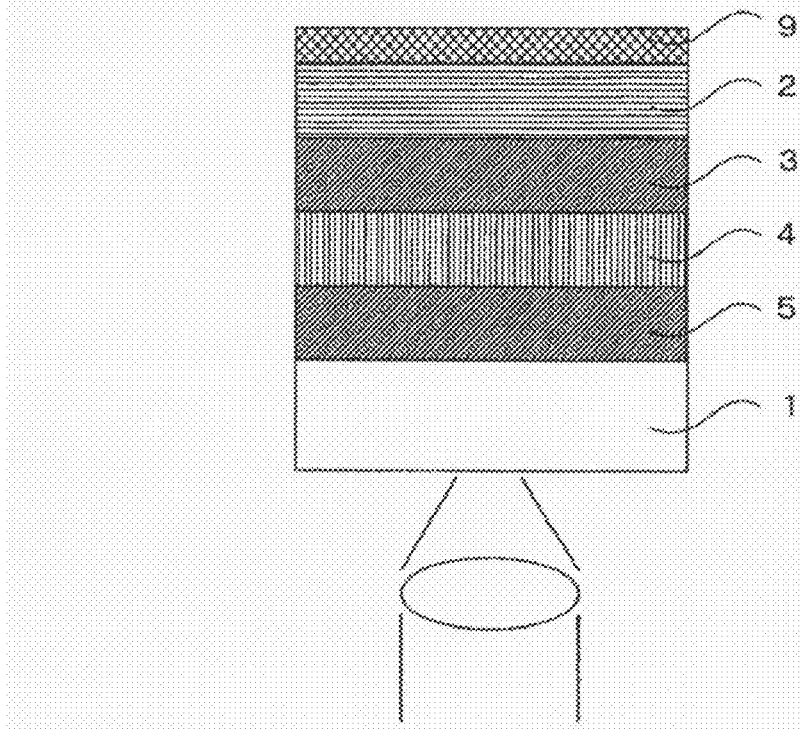
FIG. 5 is a schematic view illustrating a structural example of a write-once-read-many optical recording medium according to the present invention.
Figure 6:
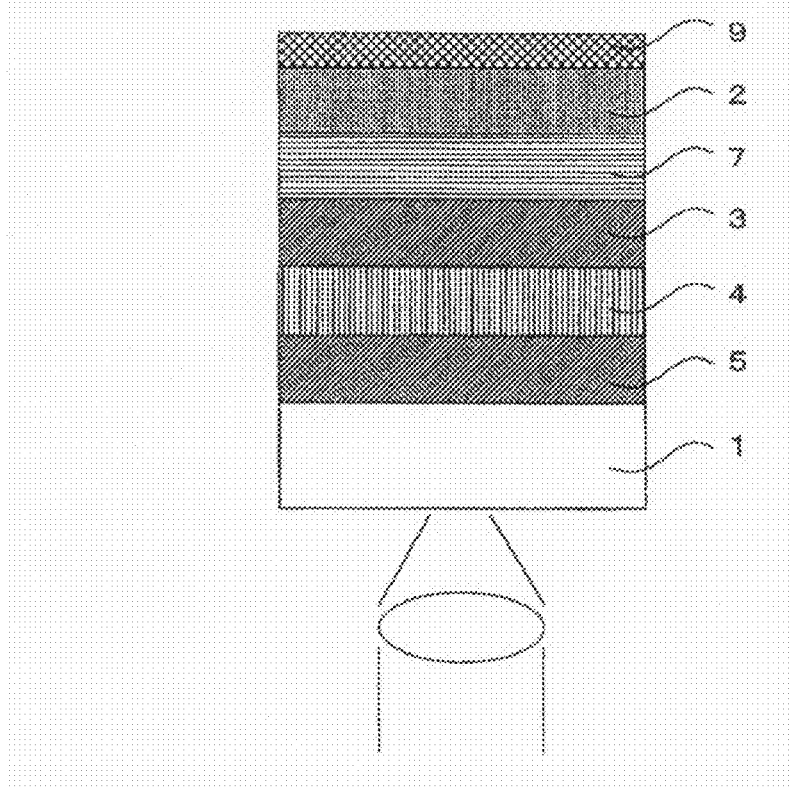
FIG. 6 is a schematic view illustrating a structural example of a write-once-read-many optical recording medium according to the present invention.

Further, as shown in FIGS. 5 and 6, it is possible to employ the layer structures wherein with respect to the layer structures shown in FIGS. 1 and 2, lamination is carried out inversely to the substrate to form substrate side incidence type optical recording media. Further, in the substrate side incidence type optical recording media, the above-mentioned diffusion preventing layer 7 or the above-mentioned coherent layer 10 may, of course, be optionally employed.

Further, as the write-once-read-many optical recording medium of the present invention, it is possible to widely apply, for example, a structure wherein a protective layer or a reflective layer is made of double layers. Now, each layer will be described in detail.

(1) Recording Layer 4

The recording layer 4 is as described in the above [1].

(2) Substrate 1

The substrate 1 is as described in the above [1].

(3) Reflective Layer 2

For the reflective layer 2, in addition to Ag or a Ag alloy, various materials such as Al, Au and alloys containing them as the main components, may be employed.

As the material for the reflective layer, it is preferred to employ an alloy containing Ag or Al as the main component, which has a high thermal conductivity and a large heat dissipation effect.

More specifically, the material for the reflective layer suitable for the present invention may be pure Ag or a Ag alloy containing at least one element selected from the group consisting of Ti, V, Ta, Nb, W, Co, Cr, Si, Ge, Sn, Sc, Hf, Pd, Rh, Au, Pt, Mg, Zr, Mo, Cu, Nd and Mn, in Ag. In a case where the stability with time is more important, it is preferred to employ at least one of Ti, Mg, Au, Cu, Nd and Pd as the additive component.

Further, as another preferred example of the material for the reflective layer, an Al alloy containing at least one element selected from the group consisting of Ta, Ti, Co, Cr, Si, Sc, Hf, Pd, Pt, Mg, Zr, Mo and Mn, in Al, may be mentioned. Such an alloy is known to improve the hillock resistance, and it can be used in consideration of the durability, volume resistivity, deposition speed, etc.

The amount of other elements to be incorporated to Ag and Al is usually at least 0.1 atomic %, preferably at least 0.2 atomic %. With respect to an Al alloy, if the content of such elements is too small, the hillock resistance tends to be inadequate in many cases, although such depends also on the deposition conditions. On the other hand, the content of the above elements is usually at most 5 atomic %, preferably at most 2 atomic %, more preferably at most 1 atomic %. If it is too large, the resistivity of the reflective layer tends to be high (the thermal conductivity tends to be small).

In a case where an Al alloy is employed, it is possible to use an Al alloy containing from 0 to 2 wt % of Si, from 0.5 to 2 wt % of Mg and from 0 to 0.2 wt % of Ti. Si has an effect to suppress fine peeling defects. However, if the content is too large, the thermal conductivity will be changed as the time passes. Accordingly, it is usually at most 2 wt %, preferably at most 1.5 wt %. Further, Mg improves the corrosion resistance of the reflective layer, but if the content is too large, the thermal conductivity is likely to change as the time passes, and it is usually at most 2 wt %, preferably at most 1.5 wt %. The content of Ti is usually at most 0.2 wt %. Ti has an effect to prevent a change of the sputtering rate. However, if the content of Ti is too large, the thermal conductivity of the reflective layer tends to be low, and casting of bulk having Ti uniformly solid-solubilized at a micro level, tends to difficult, and the target cost tends to increase. Accordingly, the content of Ti is preferably within the above range.

The thickness of the reflective layer is usually at least 40 nm, preferably at least 50 nm, and on the other hand, usually at most 300 nm, preferably at most 200 nm. If the thickness is too thick, even if the sheet resistance can be reduced, not only no adequate heat dissipating effect can be obtained, but the recording sensitivity tends to be poor. This is considered attributable to the fact that the heat capacity per unit area increases, and it takes time for heat dissipation of itself, whereby the heat dissipation effect rather tends to be small. Further, as the thickness increases, it takes time for deposition, and the cost for the material tends to increase. On the other hand, if the thickness is too thin, an influence of an island structure at the initial stage of the film growth, tends to appear, whereby the reflectance or the thermal conductivity may sometimes be low.

The reflective layer is usually formed by a sputtering method or a vacuum vapor deposition method. It is preferred to control the total amount of impurities to a level of less than 2 atomic % including the amount of impurities in the target or the vapor deposition material itself and the amount of moisture and oxygen included during the deposition. For this purpose, when the reflective layer is formed by a sputtering method, the ultimate vacuum degree of the process chamber is preferably adjusted to be less than $1 \times 10^{-3}$ Pa.

Further, in a case where deposition is carried out at an ultimate vacuum degree poorer than $10^{-4}$ Pa, it is preferred to prevent inclusion of impurities by adjusting the deposition rate to a level of at least 1 nm/sec, preferably at least 10 nm/sec. Otherwise, in a case where an intentional additive element is contained more than 1 atomic %, it is preferred to prevent inclusion of additional impurities as far as possible by adjusting the deposition rate to a level of at least 10 nm/sec.

In order to obtain still higher thermal conductivity and reliability, it is also effective to have the reflective layer constituted by multilayers. In such a case, at least one layer is preferably made of the above material having a thickness of at least 50% of the total thickness of the reflective layer. Usually, it is so designed that this layer substantially governs the heat dissipation effect, and other layers contribute to corrosion resistance, adhesion to the protective layer and improvement of hillock resistance.

(4) Protective Layers 3 and 5

The protective layer 3 and the protective layer 5 usually have the following three roles. Namely, they have a role to prevent diffusion of heat generated at the recording layer during the recording to another layer such as the substrate, a role to control the reflectance of the optical recording medium by an interference effect, and a role as a barrier layer to shutoff moisture in a high temperature high humidity environment.

As the material for forming the protective layers, a dielectric material may usually be mentioned. The dielectric material may, for example, be an oxide of Sc, Y, Ce, La, Ti, Zr, Hf, V, Nb, Ta, Zn, Al, Cr, In, Si, Ge, Sn, Sb or Te; a nitride of Ti, Zr, Hf, V, Nb, Ta, Cr, Mo, W, Zn, B, Al, Ga, In, Si, Ge, SN, Sb or Pb; or a carbide of Ti, Zr, Hf, V, Nb, Ta, Cr, Mo, W, Zn, B, Al, Ga, In or Sr. Further, a mixture of such an oxide, a nitride and a carbide, may be mentioned. Further, the dielectric material may be a sulfide, a selenide or a telluride of Zn, Y, Cd, Ga, In, Si, Ge, Sn, Pb, Sb or Bi, a fluoride of Mg, Ca or the like, or a mixture thereof.

Among these materials, $ZnS-SiO_2$, SiN, $Ta_2O_5$ or $Y_2O_2S$ may, for example, be widely used from the viewpoint of the high deposition speed, the small film stress, the small volume change due to a temperature change, and excellent weather resistance.

The thickness of a protective layer varies depending upon the position at which the protective layer is used in the optical recording medium. However, generally, the thickness of the protective layer is at least 5 nm to perform the function as a protective layer. On the other hand, the thickness is preferably at most 500 nm in order to minimize the internal stress of the dielectric itself constituting the protective layer and the difference in the elastic characteristic from the layer in contact thereby to avoid cracking. Generally, with the material constituting the protective layer, the deposition rate is small, and the deposition time is long. In order to shorten the deposition time thereby to shorten the production time to reduce the cost, it is preferred to control the thickness of the protective layer to a level of at most 300 nm. The thickness of the protective layer is more preferably at most 200 nm.

The function desired for a protective layer varies depending upon the position at which the protective layer is used in the optical recording medium. Accordingly, its thickness varies depending upon the position where the protective layer is used.

The thickness of the protective layer 5 at the laser beam incidence side in each of FIGS. 1 to 6 and FIGS. 10 to 12, is usually at least 10 nm, preferably at least 20 nm, more preferably at least 30 nm. Within such a range, the effect to prevent deformation due to heat of the substrate or the recording layer will be sufficient, and the role of the protective layer will be sufficiently obtained. On the other hand, it is usually at most 500 nm, preferably at most 300 nm, more preferably at most 200 nm. If the thickness is too much, cracking is likely to result due to the internal stress of the layer itself, and the productivity will also deteriorate. Within the above range, it is possible to prevent cracking and to maintain the productivity satisfactorily.

On the other hand, the thickness of the protective layer 3 at the reflective layer side in each of FIGS. 1 to 6, 10 and 12, is usually at least 2 nm, preferably at least 4 nm, more preferably at least 6 nm. Within such a range, it becomes possible to effectively suppress excess deformation of the recording layer. On the other hand, the thickness of the protective layer 3 at the reflective layer side is usually at most 100 nm, preferably at most 80 nm. Within such a range, a cooling effect to the recording layer will be obtained, and it becomes possible to secure control of record mark lengths.

A protective layer is usually formed by a sputtering method. It is preferred to control the total amount of impurities to a level of less than 2 atomic % including the amount of impurities in the target itself and the amount of moisture and oxygen included during the deposition. For this purpose, the ultimate vacuum degree of the process chamber is preferably set to be less than $1 \times 10^{-3}$ Pa when the protective layer is formed by a sputtering method.

(5) Light Transmission Layer 6

The light transmission layer 6 is required to protect the sputtered film from moisture or dust and at the same time to perform a role as a thin incidence substrate. Accordingly, it is preferably transparent to a laser beam to be used for recording/readout and at the same time, its thickness is preferably from 50 μm to 150 μm. Further, with respect to the thickness distribution of the light transmission layer 6, it is preferred to realize a uniform thickness distribution within 5 μm in the optical recording medium. The light transmission layer 6 is usually formed by applying an ultraviolet-curable resin by a spin coating method, followed by curing, or by bonding a transparent sheet.

(6) Diffusion Preventing Layer 7

The diffusion preventing layer 7 has a primary object to prevent diffusion of components of the dielectric used for the protective layer 3 at the reflective layer side, to the metal reflective layer 2. For the reflective layer 2, silver or a silver alloy is widely used from the viewpoint of the excellent thermal conductivity or economical efficiency. On the other hand, for the protective layer 3 at the reflective layer side, ZnS—SiO$_2$ is widely used from the viewpoint such that the film stress after the deposition is small, the heat resistance is excellent, the deposition rate is high, etc. If these two are provided so as to contact directly each other as the reflective layer 2 and the protective layer 3 at the reflective layer side, as shown in FIG. 1, 3 or 5, it is likely that sulfur in ZnS—SiO$_2$ of the protective layer 3 at the reflective layer side will diffuse to the reflective layer 2 made of silver or a silver alloy, thus leading to a decrease in the reflectance or a decrease in the thermal conductivity of the reflective layer. Accordingly, it is preferred to provide a diffusion preventing layer 7 thereby to prevent the diffusion and to improve the storage stability.

Accordingly, as the material for the diffusion preventing layer 7, a material is used which is extremely stable by itself and scarcely diffusible to the material of the reflective layer (particularly to silver or a silver alloy) (which scarcely forms a substance or solid solution with silver or a silver alloy). On the other hand, as the material for the diffusion preventing layer 7, one having a low reactivity with sulfur contained in the protective layer or one, of which a sulfide is chemically stable, is employed.

As the material for the diffusion preventing layer 7, preferred is one which satisfies conditions such that it scarcely diffuses into the reflective layer, the adhesion to the reflective layer is good, it scarcely permits the material of the protective layer to diffuse, and the adhesion to the protective layer is good. So long as these conditions are satisfied, the material of the diffusion preventing layer 7 may be suitably selected for use from single substances such as metals, semiconductors, metal oxides, metal nitrides, metal carbides, semiconductor oxides, semiconductor nitrides, semiconductor carbides, fluorides, and amorphous carbon, or mixtures thereof. Metals and semiconductors satisfying the above conditions, may, for example, be Si, Ti, Cr, Ta, Nb, Pd, Ni, Co, Mo and W. Among them, Cr, Ta, Nb, Ni or Mo is preferred from the viewpoint of the adhesion and low reactivity with the reflective layer. Further, as compounds, SiN, SiO$_2$, SiC, GeN, ZnO, Al$_2$O$_3$, Ta$_2$O$_5$, TaN, Nb$_2$O$_5$, ZrO$_2$, rare earth oxides, TiN, CrN, CaF$_2$ and MgF$_2$ may, for example, be mentioned. Among them, SiN, GeN, ZnO or Nb$_2$O$_5$ is preferred from the viewpoint of the adhesion and low reactivity with the reflective layer.

Examples of simple substances have been mentioned above, but their mixtures may also be mentioned. As typical examples of such materials, examples employing Ge—N may be mentioned which include Ge—Si—N, Ge—Sb—N, Ge—Cr—N, Ge—Al—N, Ge—Mo—N, and Ge—Ti—N. Namely, one containing, together with Ge, e.g. Al, B, Ba, Bi, C, Ca, Ce, Cr, Dy, Eu, Ga, In, K, La, Mo, Nb, Ni, Pb, Pd, Si, Sb, Sn, Ta, Te, Ti, V, W, Yb, Zn or Zr, may be mentioned.

The diffusion preventing layer 7 may be constituted by one layer only, or may have a multilayer structure comprising two or more layers. Further, the diffusion preventing layer is usually formed by a sputtering method or a reactive sputtering method.

The thickness of such a diffusion preventing layer 7 is suitably determined depending upon the particular application. Usually, the lower limit is at least 1 nm, preferably at least 2 nm, and the upper limit is at most 20 nm, preferably at most 10 nm.

(7) Underlayer 8

The underlayer 8 usually has an effect to prevent peeling between the substrate 1 and the reflective layer 2, whereby it becomes possible to obtain a recording medium excellent in weather resistance. Accordingly, it is preferred to provide the underlayer 8 between the substrate 1 and the reflective layer 2. As mentioned above, the underlayer 8 is formed for the purpose of preventing film peeling at the interface between the substrate 1 and the reflective layer 2 which is likely to take place at the time of a temperature change.

The material for the underlayer 8 is not particularly limited so long as the above object is satisfied. For example, the material for the underlayer 8 is preferably one which has good adhesion to the substrate 1 and the reflective layer 2, which does not corrode the reflective layer 2, or which does not diffuse into the reflective layer 2 and which is excellent in flatness of the film surface. So long as the above conditions are satisfied, the material for the underlayer 8 may suitably be selected for use from single substances such as metals, semiconductors, metal oxides, metal nitrides, metal carbides, semiconductor oxides, semiconductor nitrides, semiconductor carbides, fluorides and amorphous carbon, or from their mixtures. Metals and semiconductors satisfying the above conditions may, for example, be Si, Ti, CR, Ta, Nb, Pd, Ni, Co, Mo and W. Among them, Cr, Ta, Nb or Ni is preferred from the viewpoint of the adhesion and low reactivity with the reflective layer. Further, as compounds, SiN, SiO$_2$, SiC, GeN, ZnO, Al$_2$O$_3$, Ta$_2$O$_5$, TaN, Nb$_2$O$_5$, ZrO$_2$, rare earth element oxides, TiN, CrN, CaF$_2$ and MgF$_2$ may, for example, be mentioned. Among them, SiN, GeN, ZnO or Nb$_2$O$_5$ is preferred from the viewpoint of the adhesion and low reactivity with the reflective layer.

Examples of simple substances have been mentioned above, but their mixtures may also be mentioned. As typical examples of such materials, examples employing Ge—N may be mentioned which include Ge—Si—N, Ge—Sb—N, Ge—Cr—N, Ge—Al—N, Ge—Mo—N, and Ge—Ti—N. Namely, one containing, together with Ge, e.g. Al, B, Ba, Bi, C, Ca, Ce, Cr, Dy, Eu, Ga, In, K, La, Mo, Nb, Ni, Pb, Pd, Si, Sb, Sn, Ta, Te, Ti, V, W, Yb, Zn or Zr, may be mentioned.

Further, the underlayer may not necessarily have a one layer structure of a single material, but may have a multilayer structure having a plurality of materials is laminated. For example, a double layer structure having a mixture of ZnS and SiO$_2$, and Ge—Cr—N, laminated on a substrate, is conceivable. With this construction, ZnS—SiO$_2$ are excellent in the adhesion to the substrate, and further, by the presence of Ge—Cr—N, corrosion by sulfur in ZnS—SiO$_2$ can be prevented even in a case where silver or a silver alloy is used for the reflective layer.

The underlayer 8 will suffice with a thickness to be uniformly formed on the substrate 1. Inversely, if it becomes thick, the production cost, or the production time increases, and a change in the groove shape of the substrate 1 may, for example, takes place. Accordingly, the thickness is preferably from 2 nm to 20 nm. Further, like other layers, the underlayer may be prepared by a sputtering method or a reactive sputtering method.

(8) Protective Coating Layer 9

As shown in FIG. 5 or 6, in the case of a substrate side incidence type write-once-read-many optical recording medium, it is preferred to provide a protective coating layer 9 on the outermost surface side to prevent direct contact with air or to prevent scratches by contact with a foreign matter. The material for the protective coating layer 9 is not particularly limited so long as it has such a function, and an organic material such as a thermoplastic resin, a thermosetting resin, an electron beam-curable resin or an UV-curable resin, or an inorganic material such as SiO$_2$, SiN$_4$, MgF$_2$ or SnO$_2$, may, for example, be used.

The protective coating layer 9 may usually be formed by a coating method such as a spin coating method or a casting method, or by a sputtering method.

In a case where a thermoplastic resin, a thermosetting resin or the like is used as the material for the protective coating layer 9, it may be dissolved in a solvent and then coated and dried to form the layer. In a case where an UV-curable resin is employed, it may be coated as it is or as dissolved in a proper solvent and then irradiated with an UV beam for curing to form the layer. These materials may be used alone or in combination as a mixture of two or more of them. Further, the protective coating layer 9 may be made to be a multilayer film comprising two or more layers. The thickness of the protective coating layer 9 is suitably determined depending upon the particular application. The lower limit is usually at least 0.1 µm, preferably at least 0.5 µm, and the upper limit is usually at most 100 µm, preferably at most 50 µm.

(9) Coherent Layer 10

A coherent layer may be provided between the recording layer 4 and the protective layer 3 and/or the protective layer 5. In the recording layer to be used for the recording medium of the present invention, the substance A decomposes at the temperature which the recording layer reaches at the time of recording. However, at the time of the decomposition of this substance A, the recording layer 4 and the layer in contact therewith (in FIGS. 1 to 6, the protective layer 3 or the protective layer 5) may sometimes peel. Specifically, when recording is carried out by irradiating a write-once-read-many optical recording medium with laser, the protective layer 3 or the protective layer 5 may sometimes peel from the recording layer 4. In such a case, it is preferred to provide a cohesive layer 10 in contact with the recording layer 4. And, it is preferred to provide the protective layer 3 and/or the protective layer 5 in contact with this cohesive layer 10. Specifically, it is preferred to provide the cohesive layer 10 between the recording layer 4 and the protective layer 3, and/or between the recording layer 4 and the protective layer 5, as shown in FIG. 10. Particularly, peeling after recording is likely to take place between the recording layer 4 and the protective layer formed before it (in FIG. 10, the protective layer 3), and accordingly, it is particularly preferred to insert the cohesive layer 10 between the recording layer 4 and the protective layer 3.

Further, in a case where as the material for the cohesive layer 10, a material which can be used also for the protective layer 3 or the protective layer 5, is employed, the cohesive layer 10 may be employed instead of the protective layer 3 and/or the protective layer 5. As an example of such an optical recording medium, FIG. 11 illustrates an optical recording medium employing a cohesive layer 10 instead of the protective layer 3.

As the material for the cohesive layer 10, a dielectric material may usually be mentioned. The dielectric material may, for example, be an oxide of e.g. Sc, Y, Ce, La, Ti, Zr, Hf, V, Nb, Ta, Zn, Al, Cr, In, Si, Ge, Sn, Sb or Te; a nitride of e.g. Ti, Zr, Hf, V, Nb, Ta, Cr, Mo, W, Zn, B, Al, Ga, In, Si, Ge, Sn, Sb or Pb; or a carbide of e.g. Ti, Zr, Hf, B, Nb, Ta, Cr, Mo, W, Zn, B, Al, Ga, In or Si. Further, a mixture of such an oxide, a nitride and a carbide, may be mentioned. Further, the dielectric material may be a sulfide, a selenide or a telluride of e.g. Zn, Y, Cd, Ga, In, Si, Ge, Sn, Pb, Sb or Bi, a fluoride of e.g. Mg or Ca, or a mixture thereof.

Among these materials, preferred materials from the viewpoint of the heat resistance, the adhesive property between the recording layer 4 and the protective layer 3 and protective layer 5, or industrial availability, are as follows. Namely, they are an oxide of at least one element selected from the group consisting of Y, Zr, Nb, Zn, Al, Si and Sn; a nitride of Ge and/or Cr; and a carbide of Si. Of course, it is also preferred to employ a mixture of such an oxide, a nitride and a carbide. More preferred from the industrial viewpoint is an oxide of Sn—Nb (which may be a mixture of Sn oxide and Nb oxide), an oxide of Zr, an oxide of Y, an oxide of Si, an oxide of Zn, an oxide of Al, a nitride of Ge, a nitride of Ge—Cr (which may be a mixture of Ge nitride and Cr nitride), or a carbide of Si. Particularly preferred is one containing as the main component, at least one member selected from the group consisting of GeN, ZrO, ZnO and SiC (i.e. containing at least 50 atomic %, based on the entire cohesive layer). Further, when it is used as a mixture, a particularly preferred combination from the industrial viewpoint, is a combination of an oxide of Zr, an oxide of Y and an oxide of Si, or a combination of an oxide of Zn and an oxide of Al.

Of course, the above materials may be used in an optional combination of a plurality of them at an optional ratio.

Particularly preferred as the material to be used for the cohesive layer 10, is a substance having a decomposition temperature higher than the substance A to be used for the recording layer. Namely, if the decomposition temperature of the material to be used for the cohesive layer 10 is at most the decomposition temperature of the substance A, decomposition of the material of the cohesive layer 10 partly takes place at room temperature, whereby the storage stability of the write-once-read-many optical recording medium tends to be low. Further, if the material contained in the cohesive layer 10 will decompose before the decomposition of the substance A or at the same time as the decomposition of the substance A, at the temperature which the recording layer reaches at the time of recording, the desired recorded state may not sometimes be obtained.

In such a case, the material to be used for the cohesive layer 10 may be a material having a decomposition temperature which is relatively high as compared with the substance A to be used for the recording layer. For example, in a case where Sn nitride (decomposition temperature: about 340° C., from Table 1) is used as the substance A, it is also possible to employ for the cohesive layer 10 a material which may be commonly used as the substance A, such as Ge nitride (decomposition temperature: about 700° C. from Table 1) or Cr nitride (decomposition temperature: about 1,080° C. from Table 1).

The content of the above material in the cohesive layer 10 is usually at least 50 wt %, preferably at least 60 wt %, more preferably at least 70 wt %, further preferably at least 80 wt %, particularly preferably at least 90 wt %, most preferably at least 95 wt %. With a view to securing the adhesion between the recording layer 4 and the protective layer 3 or the protective layer 5, the larger the content of the above material, the better. Impurities (such as oxygen) which will be unavoidably incorporated during the formation of the cohesive layer, the upper limit of the content of the above material is usually at a level of 99.9 wt %.

The thickness of the cohesive layer 10 is usually at least 1 nm, preferably at least 2 nm, more preferably at least 3 nm, and on the other hand, usually at most 50 nm, preferably at most 30 nm, more preferably at most 20 nm. If the thickness is within such a range, the adhesive between the recording layer 4 and the protective layer 3 or the protective layer 5 can be secured satisfactorily, and the transmittance of laser to the recording layer can sufficiently be secured.

As a method for producing the cohesive layer 10, a known sputtering method may be employed. Specifically, it can be produced by a sputtering method wherein a very small amount of Ar gas is circulated in a vacuum chamber to a prescribed vacuum degree, and a voltage is applied to a target made of the prescribed material to be incorporated to the cohesive layer to carry out electric discharge for deposition.

Further, in a case where the cohesive layer 10 is formed from an oxide, a nitride or an oxynitride, a reactive sputtering method may be employed as follows. Namely, a very small amount of a mixed gas of Ar, $N_2$ and/or $O_2$ is circulated in a vacuum chamber to a prescribed vacuum degree. And, a voltage is applied to a target made of the prescribed material to carry out electric discharge. And, a single substance of element or a composite of plural elements sputtered from the target is reacted with $N_2$ and/or $O_2$ to form a nitride, an oxide or an oxynitride in the form of a film.

In such a reactive sputtering, it is possible to change the nitriding amount or oxidizing amount by changing the $N_2$ partial pressure and/or the $O_2$ partial pressure of the mixed gas of Ar, $N_2$ and/or $O_2$ circulated in the vacuum chamber (specifically the flow rate of a mixed gas of $N_2$ and/or $O_2$ to the entire mixed gas of Ar and $N_2$ and/or $O_2$).

Further, the present invention is by no means restricted to the above embodiments. The above embodiments are exemplary, and any embodiment is included in the technical scope of the present invention, so long as it has substantially the same construction and provides substantially the same effects as the technical concept disclosed in the scope of Claims of the present invention.

EXAMPLES

Now, the present invention will be described in further detail with reference to Examples.

Example 1

As an Example of the embodiment of the present invention, an optical recording medium having a structure shown in FIG. 4 was prepared. For the substrate 1, a disk-shaped polycarbonate resin having a thickness of 1.1 mm and a diameter of 120 mm was employed. For the underlayer 8, Ta was employed. For the reflective layer 2, an alloy of Ag—Cu—Nd was employed. For the diffusion preventing layer 7, Ge—Cr—N was employed. For the protective layers 3 and 5, a mixture comprising ZnS—$SiO_2$ was employed. For the recording layer 4, tin nitride (Sn nitride) was used as the substance A, and tantalum nitride (Ta nitride) was used as the substance B.

With respect to the light transmission layer 6, 2.5 g of a non-cured (non-polymerized) acrylate ultra-violet-curable agent having a viscosity of 3,000 mPa·s was dropped at the center portion of the protective layer and spin-coated at a rotational speed of 1,500 rpm for 6 seconds and then irradiated with ultraviolet rays for curing (polymerization) to obtain it. During the irradiation with ultraviolet rays, the oxygen concentration was controlled to be not more than 5% by nitrogen purging in order to prevent the polymerization inhibitory action by oxygen. The thickness of the light transmission layer 6 was adjusted to be within a range of from 95 to 105 μm. For the measurement of the thickness, after curing of the light transmission layer 6, the light transmission layer was mechanically peeled, and the thickness was measured by means of a micrometer.

A sputtering method was employed for the preparation of a multilayer film other than the substrate 1 and the light transmission layer 6. The deposition conditions and the thicknesses of the respective layers were as follows.

(A) Underlayer 8
  Sputtering target: Ta
  Sputtering power: DC 500 W
  Ar gas pressure: 0.18 Pa
  Thickness: 10 nm (B) Metal Reflective Layer 2
  Sputtering target: $Ag_{97.4}Cu_{0.9}Nd_{0.7}$ (atomic %)
  Sputtering power: DC 1,000 W
  Ar gas pressure: 0.15 Pa
  Thickness: 80 nm (C) Diffusion Preventing Layer 7
  Sputtering target: $Ge_{80}Cr_{20}$ (atomic %)
  Sputtering power: RF 300 W
  Ar+$N_2$ gas pressure: 0.18 Pa
  $N_2$/(Ar+$N_2$) flow rate ratio: 0.5
  Thickness: 3 nm (G) Reflective Layer Side Protective Layer 3
  Sputtering target: $(ZnS)_{80}$ $(SiO_2)_{20}$ (mol %)
  Sputtering power: RF 2,000 W
  Ar gas pressure: 0.25 Pa
  Thickness: 22 nm (D) Recording Layer 4
  Sputtering target: Sn and Ta (co-sputtering)
  Sputtering power for Sn: DC 210 W
    Ta: RF 300 W
  Ar+$N_2$ gas pressure: 0.35 Pa
  $N_2$/(Ar+$N_2$) flow rate ratio: 0.75
  Thickness: 15 nm (G) Laser Beam Incidence Side Protective Layer 5
  Sputtering target: $(ZnS)_{80}(SiO_2)_{20}$ (mol %)
  Sputtering power: RF 2,000 W
  Ar gas pressure: 0.25 Pa
  Thickness: 50 nm The optical recording medium having the above structure will be designated as Example 1. The compositional ratio of Sn and Ta in the recording layer was 0.04 by an atomicity ratio of Ta/(Sn+Ta), as a result of the compositional analysis by an EPMA method.

Further, Examples 2 to 4 having the same structure as in Example 1 except only that the recording layer was formed by changing the conditions as follows.

Example 2

Sputtering target: Sn and Ta (co-sputtering)
Sputtering power for Sn: DC 210 W
  Ta: RF 500 W
Ar+$N_2$ gas pressure: 0.35 Pa
$N_2$/(Ar+$N_2$) flow rate ratio: 0.75
Thickness: 15 nm Example 3

Sputtering target: Sn and Ta (co-sputtering)
Sputtering power for Sn: DC 210 W
  Ta: RF 700 W
Ar+$N_2$ gas pressure: 0.35 Pa
$N_2$/(Ar+$N_2$) flow rate ratio: 0.75
Thickness: 15 nm

Example 4

Sputtering target: Sn and Ta (co-sputtering)
Sputtering power for Sn: DC 210 W
  Ta: RF 900 W
Ar+N$_2$ gas pressure: 0.35 Pa
N$_2$/(Ar+N$_2$) flow rate ratio: 0.75
Thickness: 15 nm Also in Examples 2 to 4, the compositional ratio of Sn and Ta in the recording layer was found to be 0.09, 0.15 and 0.23, respectively, by an atomicity ratio of Ta/(Sn+Ta), as a result of the compositional analysis by an EPMA method in the same manner.

Examples 5 to 8

An optical recording medium was prepared in the same manner as in Example 1 except that in Example 1, the substance B to be used for the recording layer 4 was changed from tantalum nitride (Ta nitride) to vanadium nitride (V nitride) (Example 5).

An optical recording medium was prepared in the same manner as in Example 1 except that in Example 1, the substance B to be used for the recording layer 4 was changed from tantalum nitride (Ta nitride) to niobium nitride (Nb nitride) (Example 6).

An optical recording medium was prepared in the same manner as in Example 1 except that in Example 1, the substance B to be used for the recording layer 4 was changed from tantalum nitride (Ta nitride) to titanium nitride (Ti nitride) (Example 7).

An optical recording medium was prepared in the same manner as in Example 1 except that in Example 1, the substance B to be used for the recording layer 4 was changed from tantalum nitride (Ta nitride) to titanium nitride (Ti nitride) and silicon nitride (Si nitride) (Example 8).

However, in each Example, the thickness of the protective layer 5 was suitably controlled within a range of from 40 nm to 50 nm not to present a thermal influence to the recording layer 4, in order to adjust the reflectance of the recording medium. Further, for the deposition of the recording layer in Examples 5 to 8, a sputtering method was employed in the same manner as in Example 1, but the deposition conditions for the recording layer in each Example were as follows.

(Deposition Conditions for the Recording Layer in Example 5)

Sputtering target: Sn and V (co-sputtering)
Sputtering power for Sn: DC 90 W
  V: RF 900 W
Ar+N$_2$ gas pressure: 0.35 Pa
N$_2$/(Ar+N$_2$) flow rate ratio: 0.75
Thickness: 15 nm (Deposition Conditions for the Recording Layer in Example 6)

Sputtering target: Sn and Nb (co-sputtering)
Sputtering power for Sn: DC 90 W
  Nb: RF 900 W
Ar+N$_2$ gas pressure: 0.35 Pa
N$_2$/(Ar+N$_2$) flow rate ratio: 0.75
Thickness: 15 nm (Deposition Conditions for the Recording Layer in Example 7)

Sputtering target: SnTi mixture (Sn$_{33.3}$Ti$_{66.7}$ (atomic %))
Sputtering power: Sn$_{33.3}$Ti$_{66.7}$ (atomic %) RF 900 W
Ar+N$_2$ gas pressure: 0.35 Pa
N$_2$/(Ar+N$_2$) flow rate ratio: 0.75
Thickness: 15 nm (Deposition Conditions for the Recording Layer in Example 8)

Sputtering target: SnTi mixture (Sn$_{33.3}$Ti$_{66.7}$ (atomic %)) and Si (co-sputtering)
Sputtering power: Sn$_{33.3}$Ti$_{66.7}$ (atomic %) RF900 W
  Si: DC 150 W
Ar+N$_2$ gas pressure: 0.35 Pa
N$_2$/(Ar+N$_2$) flow rate ratio: 0.75
Thickness: 15 nm Further, as a result of the compositional analysis by EPMA, the compositional ratio of the recording layer in each of Examples 5 to 7 was found to be V/(Sn+V)=0.47 (Example 5), Nb/(Sn+Nb)=0.49 (Example 6) and Ti/(Sn+Ti)=0.58 (Example 7), respectively.

Further, with respect to the recording layer in each of Examples 5 to 8, the refractive index n and the extinction coefficient k at a wavelength of 405 nm were measured by means of an ellipsometer, whereby n=2.60, k=0.97 (Example 5), n=2.84, k=0.89 (Example 6), n=2.92, k=1.01 (Example 7), and n=2.80, k=0.76 (Example 8), respectively.

Comparative Example 1

As a Comparative Example, an optical recording medium having the same structure as in Example 1 was prepared except that the recording layer was prepared from a single substance of tin nitride (Sn nitride) as the substance A. The deposition conditions for the recording layer were as follows.

Sputtering target: Sn
Sputtering power for Sn: DC 210 W
Ar+N$_2$ gas pressure: 0.35 Pa
N$_2$/(Ar+N$_2$) flow rate ratio: 0.75
Thickness: 15 nm

Examples 9 and 10

An optical recording medium was prepared in the same manner as in Example 1 except that in Example 1, the substance A was changed from tin nitride (Sn nitride) to antimony nitride (Sb nitride), and the substance B was changed from tantalum nitride (Ta nitride) to vanadium (V nitride) (Example 9).

An optical recording medium was prepared in the same manner as in Example 1 except that in Example 1, the substance A was changed from tin nitride (Sn nitride) to antimony nitride (Sb nitride), and the substance B was changed from tantalum nitride (Ta nitride) to niobium nitride (Nb nitride) (Example 10).

However, in each Example, the thickness of the protective layer 5 was suitably controlled within a range of from 40 nm to 50 nm to present no thermal influence to the recording layer 4, in order to adjust the reflectance of the recording medium. Further, for the deposition of the recording layer in Examples 9 and 10, a sputtering method was used in the same manner as in Example 1. However, the deposition conditions for the recording layer in each Example were as follows.

(Deposition Conditions for the Recording Layer in Example 9)

Sputtering target: Sb and V (co-sputtering)
Sputtering power for Sb: DC 85 W
  V: RF 900 W
Ar+N$_2$ gas pressure: 0.35 Pa
N$_2$/(Ar+N$_2$) flow rate ratio: 0.75
Thickness: 15 nm (Deposition Conditions for the Recording Layer in Example 10)

Sputtering target: Sb and Nb (co-sputtering)
Sputtering power for Sb: DC 85 W
  Nb: RF 900 W
Ar+$N_2$ gas pressure: 0.35 Pa
$N_2$/(Ar+$N_2$) flow rate ratio: 0.75
Thickness: 15 nm As a result of the compositional analysis by EPMA, the compositional ratio of the recording layer in each of Examples 9 and 10 was found to be V/(Sb+V)=0.27 (Example 9) and Nb/(Sb+Nb)=0.40 (Example 10), respectively.

Comparative Example 2

As a Comparative Example, an optical recording medium having the same structure as in Example 1 was prepared except that the recording layer was prepared from a single substance of antimony nitride (Sb nitride) as the substance A. The deposition conditions for the recording layer were as follows.

Figure 7:
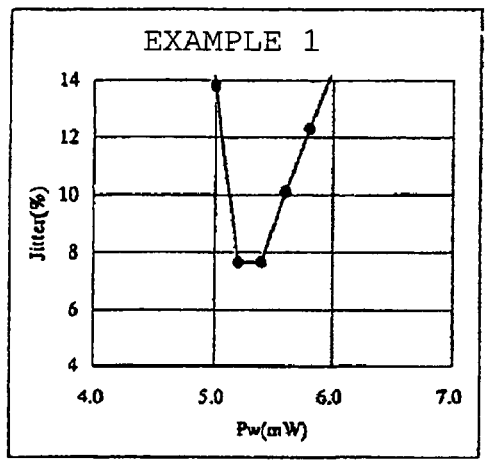
FIG. 7 are graphs showing the recording power dependency of jitter of the write-once-read-many optical recording media according to Examples of the present invention.
Figure 7:
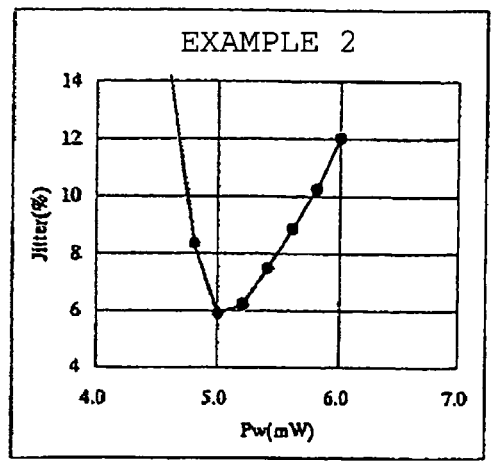
Figure 7:
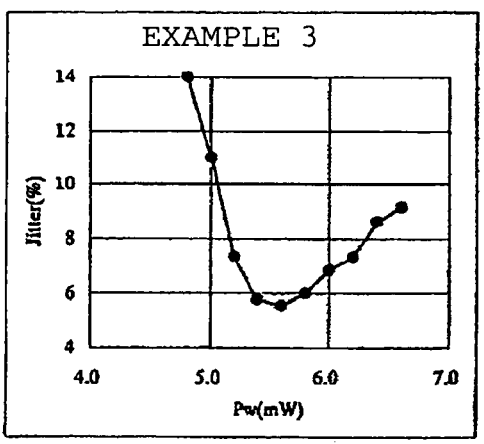
Figure 7:
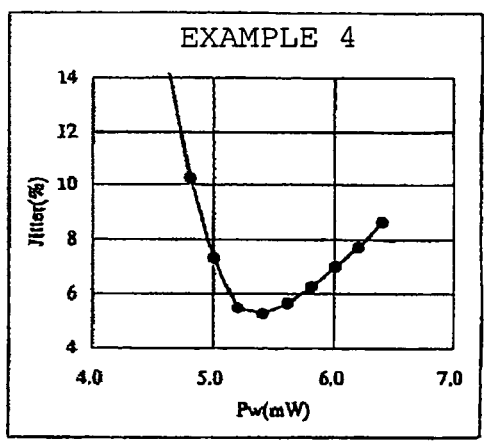
Figure 7:
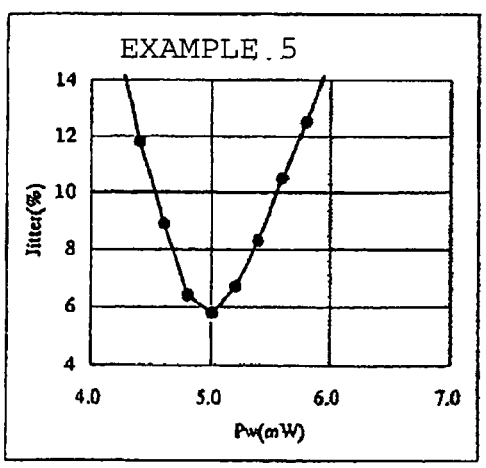
Figure 7:
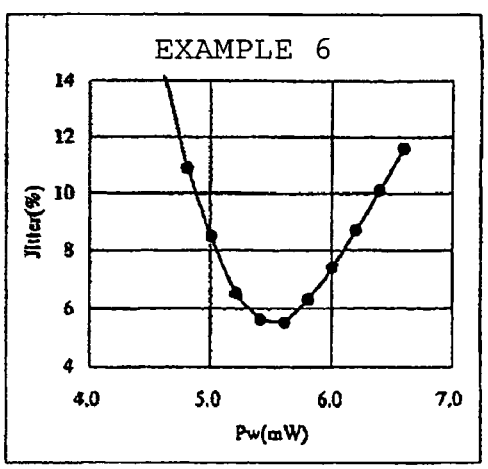
Figure 8:
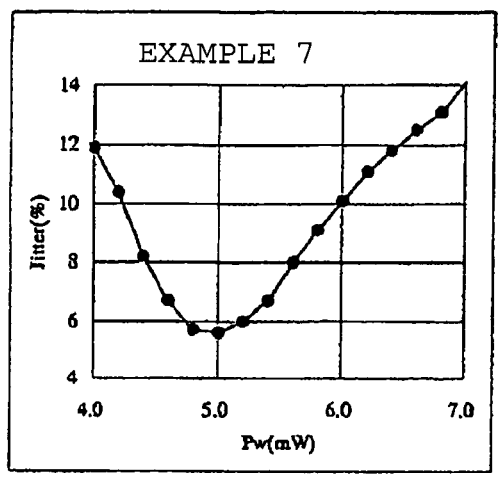
FIG. 8 are graphs showing the recording power dependency of jitter of the write-once-read-many optical recording media according to other Examples of the present invention.
Figure 8:
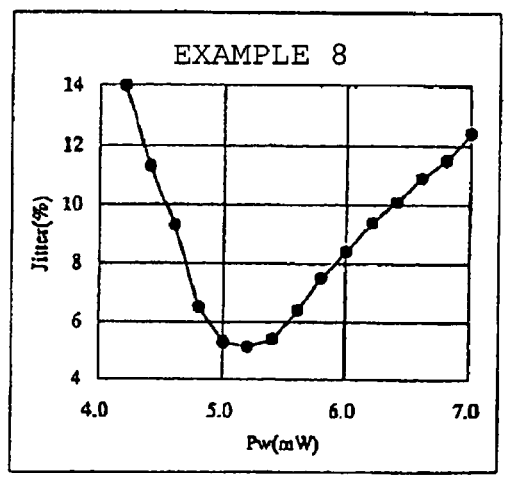
Figure 8:
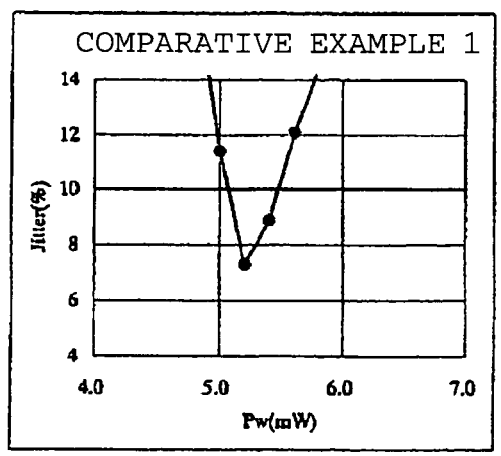
Figure 9:
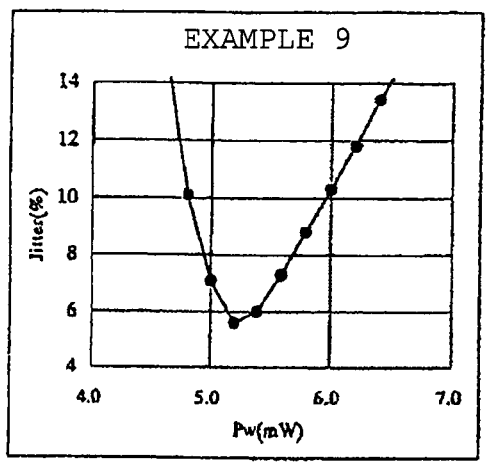
FIG. 9 are graphs showing the recording power dependency of jitter of the write-once-read-many optical recording media according to still other Examples of the present invention.
Figure 9:
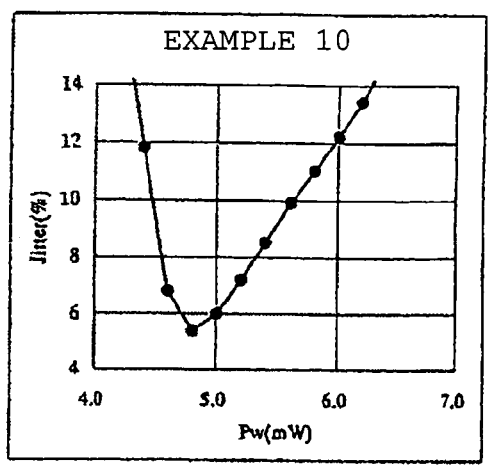
Figure 9:
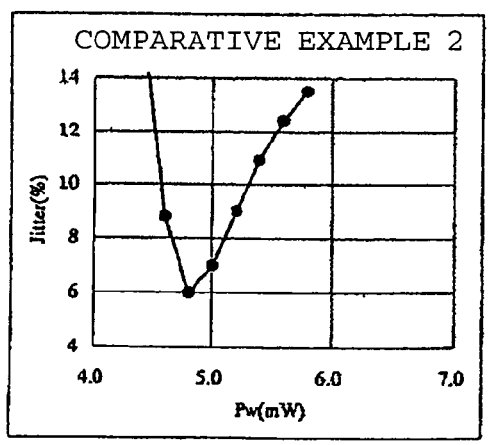

Sputtering target: Sb
Sputtering power for Sb: DC 85 W
Ar+$N_2$ gas pressure: 0.35 Pa
$N_2$/(Ar+$N_2$) flow rate ratio: 0.75
Thickness: 15 nm Evaluation With respect to the optical recording media of Examples 1 to 10 and Comparative Examples 1 and 2, recording of random signals was carried out by using an evaluation apparatus with a light source wavelength of 405 nm and a numerical aperture NA of 0.85 under the conditions comprising a linear velocity of 5.7 m/sec, RLL1-7 modulation and a channel clock of 66 MHz. The recording power dependency of jitter in a case where recording was carried out under these conditions, is shown in FIGS. 7 to 9. For the jitter, the record signals were subjected to waveform equalization by a limit equalizer, followed by binarization, and the distribution of the time difference between the rising edge and falling edge of the binarized signals and the rising edge of the periodic clock signal, was measured by a time interval analyzer (data to clock jitter).

As shown in FIGS. 7 to 9, it is evident that as compared with the Comparative Examples, the optical recording media of the respective Examples are improved in the recording power range wherein good recording signal characteristics can be obtained.

Figure 12:
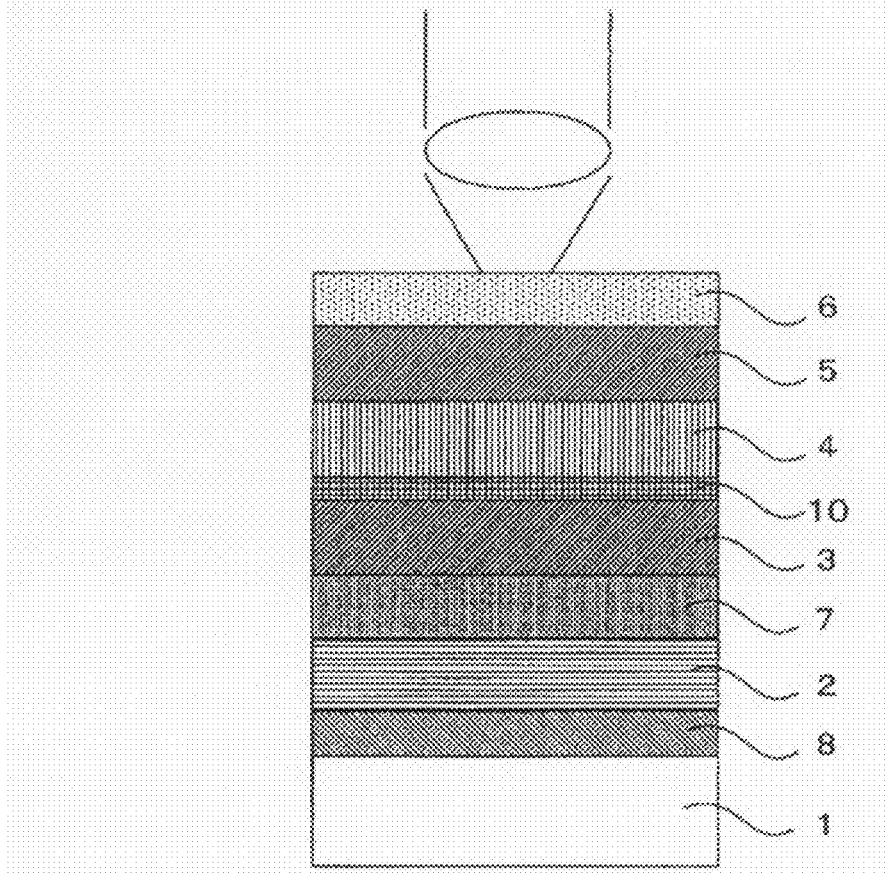
FIG. 12 is a schematic view illustrating a structural example of a write-once-read-many optical recording medium according to the present invention.

Then, in order to make the effect of the cohesive layer distinct, the optical recording medium having a structure shown in FIG. 4 was prepared as Example 11, and optical recording media having a structure shown in FIG. 12, having a cohesive layer added to such a structure, were prepared as Examples 12 to 18, as follows.

Example 11

The substrate 1 and the light transmission layer 6 were the same as in Examples 1 to 10. With respect to the multilayer film, Ta was used for the underlayer 8, an alloy of AG-Cu—Au was used for the reflective layer 2, Ge—Cr—N was used for the diffusion preventing layer 7, and a mixture comprising ZnS—$SiO_2$ was used for the protective layers 3 and 5. The recording layer 4 was prepared by a sputtering method by using tin nitride (Sn nitride) as the substance A and a substance made of niobium nitride (Nb nitride) as the substance B.

The deposition conditions and thickness of each layer were as follows.

(A) Underlayer 8
  Sputtering target: Ta
  Sputtering power: DC 500 W
  Ar gas pressure: 0.18 Pa
  Thickness: 5 nm (B) Metal Reflective Layer 2
  Sputtering target: $Ag_{97}Cu_1Au_2$ (atomic %)
  Sputtering power: DC 1,000 W
  Ar gas pressure: 0.15 Pa
  Thickness: 80 nm (C) Diffusion Preventing Layer 7
  Sputtering target: $Ge_{80}Cr_{20}$ (atomic %)
  Sputtering power: RF 300 W
  Ar+$N_2$ gas pressure: 0.18 Pa
  $N_2$/(Ar+$N_2$) flow rate ratio: 0.5
  Thickness: 3 nm (G) Reflective Layer Side Protective Layer 3
  Sputtering target: $(ZnS)_{80}(SiO_2)_{20}$ (mol %)
  Sputtering power: RF 2,000 W
  Ar gas pressure: 0.25 Pa
  Thickness: 27 nm (D) Recording Layer 4
  Sputtering target: $Sn_{50}Nb_{50}$ (wt %)
  Sputtering power for Sn: RF 500 W
  Ar+$N_2$ gas pressure: 0.35 Pa
  $N_2$/(Ar+$N_2$) flow rate ratio: 0.75
  Thickness: 13 nm (G) Laser Beam Incidence Side Protective Layer 5
  Sputtering target: $(ZnS)_{80}(SiO_2)_{20}$ (mol %)
  Sputtering power: RF 2,000 W
  Ar gas pressure: 0.25 Pa
  Thickness: 60 nm Examples 12 to 18

Examples 12 to 18 were prepared by providing a cohesive layer 10 between the reflective layer side protective layer 3 and the recording layer 4 based on the structure in Example 11. The respective layer structures are as shown in Table 3.

TABLE 3

| | Underlayer 8 (Ta) | Metal reflective layer 2 (AgCuAU) | Diffusion preventing layer 7 | Reflective layer side protective layer 3 (ZnS—$SiO_2$) | Cohesive layer 10 | Recording layer 4 (SnNbN) | Laser beam incidence side protective layer 5 (znS—$SiO_2$) |
|---|---|---|---|---|---|---|---|
| Example 11 | 5 nm | 80 nm | GeCrN 3 nm | 27 nm | Nil | 13 nm | 60 nm |
| Example 12 | 5 nm | 80 nm | GeCrN 3 nm | 27 nm | SnNbO 3 nn | 13 nm | 60 nm |
| Example 13 | 5 nm | 80 nm | GeCrN 3 nm | 25 nm | GeCrN 3 nm | 13 nm | 60 nm |
| Example 14 | 5 nm | 80 nm | ZrO—$Y_2O_3$—$SiO_2$ 3 nm | 25 nm | ZrO—$Y_2O_3$—$SiO_2$ 3 nm | 13 nm | 60 nm |

TABLE 3-continued

| | Underlayer 8 (Ta) | Metal reflective layer 2 (AgCuAU) | Diffusion preventing layer 7 | Reflective layer side protective layer 3 (ZnS—SiO$_2$) | Cohesive layer 10 | Recording layer 4 (SnNbN) | Laser beam incidence side protective layer 5 (znS—SiO$_2$) |
|---|---|---|---|---|---|---|---|
| Example 15 | 5 nm | 80 nm | ZrO—Y$_2$O$_3$—SiO$_2$ 3 nm | 25 nm | ZrO—Y$_2$O$_3$—SiO$_2$ 5 nm | 13 nm | 60 nm |
| Example 16 | 5 nm | 80 nm | ZnO—Al$_2$O$_3$ 3 nm | 25 nm | ZnO—Al$_2$O$_3$ 3 nm | 13 nm | 60 nm |
| Example 17 | 5 nm | 80 nm | ZnO—Al$_2$O$_3$ 3 nm | 25 nm | ZnO—Al$_2$O$_3$ 5 nm | 13 nm | 60 nm |
| Example 18 | 5 nm | 80 nm | SiC 3 nm | 25 nm | SiC 3 nm | 13 nm | 60 nm |

Referring to the respective layers in Examples 12 to 18, with respect to the underlayer 8, the metal reflective layer 2, the reflective layer side protective layer 3, the recording layer 4 and the laser beam incidence side protective layer 5, the same materials and deposition conditions as in Example 11 were employed.

Further, in Example 12, GeCrN was used for the diffusion preventing layer, and SnNbO was used for the cohesive layer 10. Further, in Examples 13 to 18, the diffusion preventing layer 7 and the cohesive layer 10 were prepared by the same materials under the same deposition conditions. Further, in Example 13, GeCrN was used, in Examples 14 and 15, ZrO—Y$_2$O$_3$—SiO$_2$ was used, in Examples 16 and 17, ZnO—Al$_2$O$_3$ was used, and in Example 18, SiC was used. The deposition conditions for GeCrN were the same as in Example 11, and other SnNbO, ZrO—Y$_2$O$_3$—SiO3, ZnO—Al$_2$O$_3$ and SiC were prepared under the following deposition conditions.

(SnNbO)
  Sputtering target: Sn$_{50}$Nb$_{50}$ (wt %)
  Sputtering power for Sn: RF 500 W
  Ar+N$_2$+O$_2$ gas pressure: 0.35 Pa
  flow rate ratio of Ar:N$_2$:O$_2$=5:15:5

(ZrO—Y$_2$O$_3$—SiO$_2$)
  Sputtering target: ((ZrO)$_{97}$ (Y$_2$O$_3$)$_3$)$_{80}$(SiO$_2$)$_{20}$ (mol %)
  Sputtering power: RF 1,000 W
  Ar gas pressure: 0.35 Pa (ZnO—Al$_2$O$_3$)
  Sputtering target: ((ZrO)$_{97}$(Y$_2$O$_3$)$_3$ (mol %)
  Sputtering power: RF 1,000 W
  Ar gas pressure: 0.35 Pa (SiC)
  Sputtering target: SiC
  Sputtering power: RF 1,000 W
  Ar gas pressure: 0.28 Pa (Evaluation)

With respect to the optical recording media of Examples 11 to 18, recording was carried out with a width of 0.5 mm in the radial direction by using an evaluation apparatus with a light source wavelength of 406 nm and a numerical aperture NA of 0.85 (which is different from one used for the evaluation of the optical recording media of Examples 1 to 10) under the conditions comprising a linear velocity of 4.92 m/sec, 17 PP modulation and a channel clock of 66 MHz. Then, they were stored 100 hours in an environment of 85° C./85% Rh (environmental test). And, the jitter values at the center portion of the recorded portion were measured before and after the environmental test. The jitter values were measured in the same manner as in Examples 1 to 10. Further, the power at the time of recording was selected to be a recording power at which the jitter was minimum.

In Example 11, a good jitter value was shown before the environmental test, but after the environmental test, high reflectance portions were present in a spike form in the recorded signals, and it was difficult to measure the jitter. This optical recording medium after the environmental test was observed by an optical microscope, whereby many bright defects were observed. It is considered that such bright defects are attributable to peeling which took place between the recording layer 4 and the reflective layer side protective layer 3.

Whereas, with respect to Examples 12 to 18, as shown in Table 4, the change in the jitter value as between before and after the environmental test was suppressed to be within 1%. Further, these optical recording media after the environmental test were observed by an optical microscope, whereby such defects as observed in Example 11, were not observed.

TABLE 4

| | Jitter before the environmental test (%) | Jitter after the environmental test (%) | Observation by optical microscope after the environmental test |
|---|---|---|---|
| Example 11 | 5.9 | — | Many bright defects observed |
| Example 12 | 6.2 | 6.4 | No defects observed |
| Example 13 | 5.9 | 6.1 | No defects observed |
| Example 14 | 5.9 | 6.0 | No defects observed |
| Example 15 | 6.2 | 6.2 | No defects observed |
| Example 16 | 6.2 | 7.1 | No defects observed |
| Example 17 | 6.4 | 7.2 | No defects observed |
| Example 18 | 6.0 | 5.8 | No defects observed |

From the foregoing, it is evident that by providing the cohesive layer 10, it is possible to suppress peeling at the portion in contact with the recording layer 4, whereby it is possible to obtain an optical recording medium having improved weather resistance.

Example 19

Further, as an Example wherein a nitride and an oxide are coexistent in the recording layer, an optical recording medium was prepared wherein the recording layer having the structure of Example 11 was made of a mixture of a nitride and an oxide.

The substrate 1 and the light transmission layer 6 were the same as in Examples 1 to 18. With respect to the multilayer film, the same structure as in Example 11 was adopted except that Nb was used for the underlayer 8, and a mixture comprising a nitride of Sn, an oxide of Sn, a nitride of Nb and an oxide of Nb, was used for the recording layer 4. The deposition conditions and the thickness of each layer was as follows.

(A) Underlayer 8
  Sputtering target: Nb
  Sputtering power: DC 500 W
  Ar gas pressure: 0.18 Pa
  Thickness: 5 nm (B) Metal Reflective Layer 2
   Sputtering target: $Ag_{97}Cu_1Au_2$ (atomic %)
   Sputtering power: DC 1,000 W
   Ar gas pressure: 0.15 Pa
   Thickness: 80 nm (C) Diffusion Preventing Layer 7
   Sputtering target: $Ge_{80}Cr_{20}$ (atomic %)
   Sputtering power: RF 300 W
   $Ar+N_2$ gas pressure: 0.18 Pa
   $N_2/(Ar+N_2)$ flow rate ratio: 0.5
   Thickness: 3 nm (G) Reflective Layer Side Protective Layer 3
   Sputtering target: $(ZnS)_{80}(SiO_2)_{20}$ (mol %)
   Sputtering power: RF 2,000 W
   Ar gas pressure: 0.25 Pa
   Thickness: 25 nm (D) Recording Layer 4
   Sputtering target: $Sn_{50}Nb_{50}$ (wt %)
   Sputtering power for $Sn_{50}Nb_{50}$: DC 500 W
   $Ar+N_2+O_2$ gas pressure: 0.30 Pa
   $Ar:N_2:O_2=25:73.75:1.25$
   Thickness: 14 nm (G) Laser Beam Incidence Side Protective Layer 5
   Sputtering target: $(ZnS)_{80}(SiO_2)_{20}$ (mol %)
   Sputtering power: RF 2,000 W
   Ar gas pressure: 0.25 Pa
   Thickness: 50 nm (Evaluation)

Evaluation of the recording characteristics of the recording medium of Example 19 was carried out in the same manner as in Examples 11 to 18 by using an evaluation apparatus with a light source wavelength of 406 nm and a numerical aperture NA of 0.85 (which is different from the one used for evaluation of the optical recording media of Examples 1 to 10). Specifically, evaluation was carried out by recording random signals comprising 17PP modulation code under the conditions comprising a linear velocity of 4.92 m/sec and a channel clock of 66 MHz, and measuring the jitter value.

Figure 13:
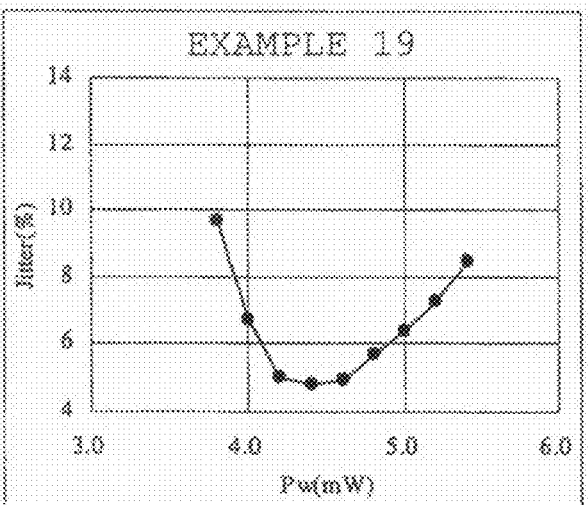
FIG. 13 is a graph showing the recording power dependency of jitter of the write-once-read-many optical recording medium according to another example of the present invention.

FIG. 13 shows the recording power dependency of the jitter value. As shown in FIG. 13, under the conditions where the recording density was high, a good jitter value was obtained, and a wide recording power range wherein a good jitter value was obtained, was present.

It is considered that by using a mixed gas of Ar, $N_2$ and $O_2$ for the deposition of the recording layer, the recording layer becomes a mixture of tin nitride, tin oxide, niobium nitride and niobium oxide. The purpose of mixing an oxide in Example 19 was to reduce the absorption of the entire recording layer and to increase the reflectance of the optical recording medium, by mixing tin oxide and niobium oxide having small absorption as compared with tin nitride and niobium nitride, in the recording layer. In reality, with the optical recording medium of Example 19, a high reflectance of 21% in a non-recorded state was obtained.

Here, it is difficult to accurately determine the proportion of oxides in the recording layer, because by an analytical means such as EPMA, it is difficult to identify gaseous element components present in the atmosphere. However, in Example 19, the proportion occupied by oxygen in the gas for deposition is very small at a level of 1.25%, and accordingly, the proportion of oxides in the entire recording layer is considered to be at most 30% by molar ratio of the respective compounds.

INDUSTRIAL APPLICABILITY

According to the present invention, it is possible to obtain a recording medium which can be adapted for high densification of information. Particularly, it is possible to obtain a write-once-read-many optical recording medium with a wide range of recording powers wherein good recording signal characteristics can be obtained.

The present application is based on a Japanese Patent Application filed on Aug. 21, 2003 (Japanese Patent Application No. 2003-297711) a Japanese Patent Application filed on Oct. 31, 2003 (Japanese Patent Application No. 2003-371871 and a Japanese Patent Application filed on May 31, 2004 (Japanese Patent Application No. 2004-161554), and the entire disclosures thereof are hereby included by reference.

What is claimed is:

1. A recording medium having a recording layer, whereby recording is carried out by heating the recording layer, wherein the recording layer contains a substance A which decomposes at a temperature which the recording layer reaches when heated for recording, and a substance B which does not undergo a chemical reaction or phase change at a temperature which the recording layer reaches when heated for recording.

2. The recording medium according to claim 1, wherein at the temperature which the recording layer reaches, the substance B does not undergo a chemical reaction and phase change.

3. The recording medium according to claim 1, wherein at the temperature which the recording layer reaches, the substance B does not decompose or chemically react.

4. The recording medium according to claim 1, wherein at the temperature which the recording layer reaches, the substance B does not melt or sublime.

5. The recording layer according to claim 1, wherein the difference between the decomposition temperature of the substance A and the decomposition temperature or the melting point of the substance B is at least 200° C.

6. The recording medium according to claim 1, wherein the recording medium is a write-once-read-many optical recording medium having a recording layer on a substrate, whereby recording is carried out by laser irradiation.

7. The recording medium according to claim 1, wherein the substance A is a substance having a decomposition temperature at at most 1200° C., and the substance B is a substance having no decomposition temperature or melting point at at most 1500° C.

8. The recording medium according to claim 1, wherein each of the substance A and the substance B is a nitride and/or an oxide.

9. The recording medium according to claim 8, wherein the substance A is a nitride of at least one element selected from the group consisting of Cr, Mo, W, Fe, Ge, Sn and Sb.

10. The recording medium according to claim 8, wherein the substance B is a nitride of at least one element selected from the group consisting of Ti, Zr, Hf, V, Nb, Ta, Al and Si.

11. The recording medium according to claim 8, wherein element α other than nitrogen and oxygen among elements constituting the substance A and element β other than nitrogen and oxygen among elements constituting the substance B satisfy the relation of $0.03 \leq$ (atomicity of β)/((atomicity of α)+(atomicity of β))$\leq 0.95$.

12. The recording medium according to claim 11, wherein (atomicity of β)/((atomicity of α)+(atomicity of β))$\leq 0.7$.

13. The recording medium according to claim 1, wherein the thickness of the recording layer is from 4 nm to 30 nm.

14. The recording medium according to claim 1, wherein a coherent layer is provided in contact with the recording layer.

15. The recording medium according to claim 14, wherein a protective layer is provided in contact with the coherent layer.

16. The recording medium according to claim 14, wherein the coherent layer contains a substance having a higher decomposition temperature than the substance A.

17. The recording medium according to claim 14, wherein the coherent layer contains as the main component at least one member selected from the group consisting of GeN, ZrO, ZnO and SiC.

18. The recording medium according to claim 6, wherein the extinction coefficient at the recording laser wavelength of the recording layer is at least 0.2 and at most 1.6.

* * * * *